United States Patent [19]
Nicholson

[11] Patent Number: 4,609,559
[45] Date of Patent: Sep. 2, 1986

[54] TAR-DEPLETED LIQUID SMOKE AND METHOD OF PREPARATION

[75] Inventor: Myron D. Nicholson, Lockport, Ill.

[73] Assignee: Viskase Corporation, Chicago, Ill.

[21] Appl. No.: 556,443

[22] Filed: Nov. 30, 1983

Related U.S. Application Data

[60] Division of Ser. No. 417,173, Sep. 14, 1982, Pat. No. 4,431,033, which is a continuation-in-part of Ser. No. 312,366, Oct. 16, 1981, abandoned.

[51] Int. Cl.⁴ ............................................. A23L 1/221
[52] U.S. Cl. ................................... 426/650; 426/429; 426/652
[58] Field of Search ............... 426/90, 105, 129, 250, 426/315, 534, 650, 429, 431, 652, 135, 138, 140, 265, 268; 428/36; 138/118.1, 145

[56] References Cited

U.S. PATENT DOCUMENTS

| | | | |
|---|---|---|---|
| 3,106,473 | 10/1963 | Hollenbeck | 426/650 |
| 3,663,237 | 5/1972 | Moller | 426/429 X |
| 3,873,741 | 3/1975 | Melcer et al. | 426/431 X |
| 3,875,314 | 4/1975 | Wistreich et al. | 426/431 X |
| 4,104,408 | 8/1978 | Chiu | 426/135 |
| 4,118,519 | 10/1978 | Juhn et al. | 426/429 X |
| 4,359,481 | 11/1982 | Smits et al. | 426/652 X |

FOREIGN PATENT DOCUMENTS 151768 9/1950 Australia .
1492639 1/1969 Fed. Rep. of Germany .

*Primary Examiner*—Arthur L. Corbin
*Attorney, Agent, or Firm*—James L. Sonntag

[57] ABSTRACT

A tar-containing aqueous liquid wood smoke is extracted with selected organic liquid solvents to form a tar-enriched liquid fraction and a tar-depleted aqueous liquid smoke fraction, the latter being used for food casing treatment to facilitate smoke coloring and flavoring of encased foodstuff during processing.

29 Claims, 13 Drawing Figures

TAR-DEPLETED LIQUID SMOKE AND METHOD OF PREPARATION

This application is a division of prior U.S. application Ser. No. 417,173, filing date Sept. 14, 1982, now U.S. Pat. No. 4,431,033 which is a continuation-in-part of application Ser. No. 312,366 Oct. 16, 1981, now abandoned.

RELATED APPLICATIONS

U.S. Application Ser. No. 556,442, filed Nov. 30, 1983 entitled "Tar-Depleted Liquid Smoke," filed in the name of Herman Shin-Gee Chiu, now U.S. Pat. No. 4,505,939, issued Mar. 19, 1985, U.S. Application Ser. No. 417,172, filed Sept. 14, 1982, entitled "Tar-Depleted Liquid Smoke Treatment of Food Casings," filed in the name of Myron Donald Nicholson, now U.S. Pat. No. 4,431,032, issued Feb. 14, 1984 and U.S. Application Ser. No. 261,457 entitled "Liquid Coating Method and Apparatus," filed May 7, 1981 in the names of Chiu et al, now U.S. Pat. No. 4,356,218, issued Oct. 26, 1982, disclose subject matter related to the instant application.

BACKGROUND OF THE INVENTION

1. Field of the Invention

This invention relates to: (a) a method for preparing tar-depleted liquid smoke from a tar-containing aqueous liquid smoke solution, (b) a tar-depleted smoke colored and flavored tubular food casing, (c) a tar-depleted aqueous liquid smoke solution with smoke color, odor and flavor capability, and (d) a method for preparing smoke colored and smoke flavored encased foodstuff.

2. Description of the Prior Art

Tubular cellulosic food casings are used extensively for processing a great variety of meat products and other food items. The food casings are generally thin-walled tubing of various diameters prepared from reconstituted materials, such as regenerated cellulose. Cellulosic food casings may also be prepared with fibrous webs embedded in the wall thereof, such casings commonly being referred to as "fibrous food casings."

The many different recipes and modes of processing that are used by the processed food industry to suit different tastes, and even regional preferences, generally necessitate the use of food casings with a variety of characteristics. In some instances, for example, food casings are required to have multifunctional uses wherein they serve as containers during the processing of a food product encased therein, and then also serve as a protective wrapping for the finished product. In the processed meat industry, however, the food casings used in the preparation of many types of meat products, such as various types of sausages, such as frankfurters, bolognas and the like, beef rolls, hams and the like, are frequently removed from about the processed meat product prior to slicing and/or final packaging.

Surface appearance and flavor are important factors in the commercial and consumer acceptance of processed meat products, and a common feature of most varieties of such products involves the use of "smoking" for imparting characteristic flavor and color thereto. The "smoking" of food products is generally accomplished by the food processor subjecting the food product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of liquid aqueous solutions of wood-derived smoke constituents, commonly called "liquid smoke solutions" that have been developed and used commercially by the food processor in the processing of many types of meat and other food products. For convenience in this specification, the as-purchased "liquid smoke solution" will be frequently referred to as "as-is" liquid smoke.

The application of "liquid smoke solutions" to meat products is generally carried out in a variety of ways, including spraying or dipping an encased food product during the processing thereof, or by incorporating the "liquid smoke solution" in the recipe itself. The actual operation of "smoking" by spraying or dipping is not completely satisfactory due to inability to treat the encased product uniformly, and incorporation of "liquid smoke solutions" in the meat recipe does not always provide the desired surface appearance because of dilution of smoke ingredients. Incorporation in the recipe also reduces the stability of the meat emulsion, and will adversely affect taste if high concentrations are used. Application of liquid smoke to encased food products by the food processor, such as by spraying or dipping, also causes unwanted pollution and equipment corrosion problems for the food processor. In addition, encased sausages treated by application of the liquid smoke during commercial processing have been found to yield, after peeling the casing from the treated encased food product, sausages which are lacking in smoke color uniformity from sausage to sausage, and from batch of sausages to batch of sausages. What is even more undesirable is the lack of uniformity of coloration which often appears on the surface of the same sausage, including light and dark streaks, light and dark blotches, and even uncolored spots which especially appear at the ends of sausages.

It has also been suggested, as for example disclosed in U.S. Pat. No. 3,330,669 to Hollenbeck, that application of a viscous liquid smoke solution to the inside surface of a deshirred tubular food casing by the food processor immediately prior to stuffing the casing with a sausage emulsion, results in preparation of processed food products that exhibit acceptable color and smoky flavor after cooking and removal of the casing. However, the Hollenbeck procedure has not been found practical and is not used commercially. The viscous liquid smoke solution disclosed by Hollenbeck is not practical for coating a casing on a high speed production line to produce a coated casing which can then be shirred by conventional methods and used as a shirred casing on an automatic stuffing machine. The high viscosity of the Hollenbeck coating solution limits the casing coating speed and, if a conventional method such as "slugging", also called "bubble coating", is used to coat the inside of casing, the viscous Hollenbeck coating necessitates frequently cutting the casing open to replenish the slug of coating material within the casing, which results in short lengths of casing and thus makes continuous shirring impractical.

Heretofore, however, it has been found that providing casings which afford special treatment or structural characteristics to the food product can be more uniformly and economically accomplished by the casing manufacturer. This is especially true with the advent of, and wide commercial use of, automatic stuffing and processing equipment in the processed food industry.

Several methods of providing food casings with coatings applied to a surface thereof are known and described in the patent literature. There is disclosed, for example, in U.S. Pat. No. 3,451,827 a spraying method for applying a variety of coating materials over the internal surface of small diameter casings. In U.S. Pat. No. 3,378,379 to Shiner et al., a "slugging" method is used for applying coating materials to the internal surface of large diameter casings. While such techniques and others have been used in preparing commercial quantities of a variety of coated food casings, including casings where liquid smoke is employed as a component in the coating composition, the casings produced thereby have been designed to meet particular commercial requirements and, to the best of my knowledge, none of the prior art coated casings disclosed have been known to successfully impart a satisfactory level of "smoke" flavor and color to a meat product processed therein. For example, in U.S. Pat. No. 3,360,383 to Rose et al. and in U.S. Pat. Nos. 3,383,223 and 3,617,312 to Rose, there are disclosed coating compositions of various protein materials, such as gelatin, that employ liquid smoke solutions in amounts specifically required to insolubilize the protein materials. Such coated casings are disclosed as exhibiting special adhesion properties required for the processing of dry sausages, which properties would therefore limit the suitability thereof for many other casing applications.

The prior art patents teach application of liquid smoke to the internal surface of a casing, but attempts to internally coat the casing during the manufacture thereof have been found to be costly and to limit the speed of a continuous high speed production line.

One solution to this problem as described and claimed in copending United States application Ser. No. 062,358 filed July 3, 1979 in the name of Herman Shin-Gee Chiu, now abandoned, involves treating the external surface of the food casing with an aqueous liquid smoke composition derived from natural wood. Chiu also discovered that when the food casing is cellulosic and formed of either non-fibrous gel stock or fibrous gel stock, the use of highly acidic (pH of 2.0 to 2.5) aqueous liquid smoke results in the formation of a tarry deposit accumulating on the carrier rolls and the squeeze rolls of the smoke treatment unit, thereby eventually forcing shutdown of the treating system. It was discovered that this problem could be overcome by at least partially neutralizing the as-is liquid smoke to precipitate the tar, and then treating the cellulosic gel stock casing with the tar-depleted liquid smoke. Chiu discovered that contrary to the previous state-of-art belief, the tar-depleted liquid smoke, surprisingly, still possesses significant smoke coloring and flavoring capability, and this invention is described and claimed in his previously referenced United States application Ser. No. 417,171, "Tar-Depleted Liquid Smoke and Treated Food Casing", filed contemporaneously with this application.

One problem with the neutralization method of preparing the low tar aqueous liquid smoke composition of the last-mentioned Chiu application is that the coloration capability or "Staining Power" of the wood-derived liquid smoke declines with increasing pH or neutralization.

One object of this invention is to provide a method for preparing tar-depleted liquid smoke from a tar-containing wood-derived liquid smoke without requiring neutralization of the latter.

Another object of this invention is to provide a tar-depleted aqueous liquid smoke solution with high capability for imparting smoke color, odor and flavor to food products.

Still another object of this invention is to provide a tar-depleted, smoke colored and flavored tubular food casing with high capability for imparting smoke color, odor and flavor to food products encased therein, by treatment with the aforementioned solution in turn prepared by the aforementioned method.

A further object of this invention is to provide a method for preparing a smoke colored and smoke flavored foodstuff within the aforementioned tar-depleted, smoke colored and smoke flavored tubular food casing.

Other objects and advantages of the invention will become apparent from the ensuing disclosure and appended claims.

SUMMARY OF THE INVENTION

In this invention a method is provided for the preparation of an aqueous smoke composition comprising contacting a tar-containing aqueous liquid smoke solution having an absorptive power (defined hereinafter) of at least about 0.25 at 340 nm. wave length with either a nonreactive or reactive organic liquid solvent which has a hydrogen bonding solubility parameter of at least about 2.7 and which is immiscbile in the aqueous liquid smoke solution. To be useful in this invention, organic liquid solvents which react with the liquid smoke must form a derivative liquid solvent which is immiscible in the liquid smoke solution and exhibit the aforementioned hydrogen bonding parameter in the liquid smoke environment. The contacting is in a volume ratio between about 1:1 and about 65:1 of liquid smoke solution to liquid solvent.

This contact is performed under extraction conditions to form a tar-enriched liquid solvent fraction and a tar-depleted aqueous liquid smoke fraction, and the fractions are separated to provide the tar-depleted liquid smoke as the aqueous liquid smoke composition.

The invention also includes a tar-depleted smoke colored and smoke flavored tubular casing. The latter is prepared by the steps of providing a tar-containing aqueous liquid wood smoke solution having an absorptive power of at least about 0.25 at 340 nm. and contacting same with a nonreactive immiscible organic liquid solvent having a hydrogen bonding solubility parameter in the liquid smoke environment of at least about 2.7. Alternatively, the organic liquid solvent may be reactive with the liquid smoke if it forms a derivative liquid solvent which is immiscible in the liquid smoke solution and possesses a hydrogen bonding parameter of at least 2.7 in this environment. The contacting is in a volume ratio between about 1:1 and about 65:1 of liquid smoke solution to liquid solvent under extraction conditions to provide a tar-enriched liquid solvent fraction and a tar-depleted aqueous liquid smoke fraction. The fractions are separated to provide the latter as the tar-depleted liquid smoke. A surface of a tubular food casing is treated with the tar-depleted liquid smoke in a quantity such that the casing develops an absorptive index (defined hereinafter) of at least about 0.2 at 340 nm wave length for smoke coloring and smoke flavoring constituents in the casing wall.

This invention also includes a tar-depleted aqueous liquid smoke solution with smoke color, odor and flavor capability, prepared by contacting a tar-containing liquid smoke solution having an absorptive power of at least about 0.25 at 340 nm. with a nonreactive organic liquid solvent which is immiscible in the aqueous liquid smoke solution and has a hydrogen bonding parameter of at least about 2.7 in the liquid smoke environment. Alternatively, a reactive organic liquid solvent may be used if it satisfies the previously described criteria for the preparative method and the treated casing. The contacting is in a volume ratio between about 1:1 and about 65:1 of liquid smoke solution to liquid solvent. This contact is also under extraction conditions to form a tar-enriched liquid solvent fraction and a tar-depleted aqueous liquid smoke fraction. The fractions are separated to provide the tar-depleted aqueous liquid smoke solution as the tar-depleted aqueous liquid smoke composition.

Still another aspect of this invention relates to a method for producing a foodstuff having smoke color, odor and flavor including the steps of providing a tar-containing aqueous liquid wood smoke solution comprising a mixture of smoke color, odor and flavor constituents having an absorptive power of at least about 0.25 at 340 nm. The liquid smoke solution is contacted with a nonreactive organic liquid solvent which is immiscible in the aqueous liquid smoke solution and has a hydrogen bonding solubility parameter of at least about 2.7 in the liquid smoke environment. Alternatively, the organic liquid solvent may be reactive with the liquid smoke solution if it satisfies the previously discussed criteria. The contacting is in a volume ratio between about 1:1 and about 65:1 of liquid smoke solution to liquid solvent. This contact is under extraction conditions to form a tar-enriched liquid solvent fraction and a tar-depleted liquid smoke fraction, and the fractions are separated to provide a tar-depleted liquid smoke as an aqueous liquid smoke composition. A surface of a tubular food casing is treated with the tar-depleted aqueous liquid smoke in a quantity such that the casing develops an absorptive index of at least 0.2 at 340 nm wave length for the casing wall. The so-treated casing is stuffed with foodstuff and the resulting encased foodstuff is processed under conditions sufficient to impart smoke color, odor and flavor to the encased foodstuff by transfer of smoke color, odor and flavor constituents from the casing to the encased foodstuff.

DESCRIPTION OF THE PREFERRED EMBODIMENTS

Figure 1:
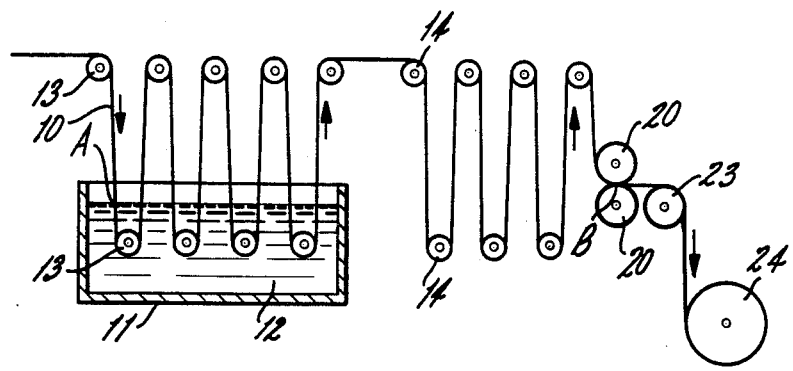
FIG. 1 is a schematic view of apparatus suitable for treatment of food casing external surface with tar-depleted liquid smoke in accordance with one embodiment of this invention.

Food casings that are suitable for use in the present invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like, in a variety of diameters. Also suitable are tubular cellulosic casings having a fibrous reinforcing web embedded in the wall thereof, which are commonly called "fibrous food casings", as well as cellulosic casings without the fibrous reinforcement, herein referred to as "non-fibrous" cellulosic casings.

Casings conventionally known as "dry stock casings" may be used in the practice of this invention. Such casings generally have a water content within the range of from about 5 to about 14 weight percent water if non-fibrous casing, or within the range of from about 3 to about 8 weight percent water if fibrous casing, based on the total weight of casing including water.

Casings conventionally known as "gel stock casings" are casings which have higher moisture contents since they have not been previously dried, and such casings may also be used in the practice of this invention. Gel stock casings, whether fibrous or non-fibrous, are the type exhibiting the aforementioned tarring problem when treated by as-is liquid smoke.

Smoke color, odor and flavor constituents suitable for use in accordance with the present invention are generally those designated as being the color, odor and flavor constituents of as-is liquid smoke.

The term "solution" as used herein is meant to encompass homogeneous true solutions, emulsions, colloidal suspensions and the like.

Liquid smoke often is a solution of natural wood smoke constituents prepared by burning a wood, for example, hickory or maple, and capturing the natural smoke constituents in a liquid medium such as water. Alternatively, the liquid smoke to be used may be derived from the destructive distillation of a wood, that is, the breakdown or cracking of the wood fibers into various compounds which are distilled out of the wood char residue. Aqueous liquid smokes are generally very acidic, usually having a pH of 2.5 or less and a titratable acidity of at least 3% by weight.

Reference to the term "smoke color, odor and flavor constituents", as used throughout this specification and in the appended claims with respect to the liquid smoke compositions and casings of this invention, is intended to refer to, and should be understood as referring to, the smoke color, odor and flavor constituents derived from liquid smoke solutions in their present commercially available form.

The tar-depleted liquid smoke composition of this invention is derived from natural wood smoke constituents. It is prepared by contacting a tar-containing source liquid smoke with suitable nonreactive or certain reactive organic solvents, as hereinafter described, to extract the tars therefrom. The source liquid smoke is generally produced by the limited burning of hardwoods and the absorption of the smoke so generated, into an aqueous solution under controlled conditions. The limited burning keeps some of the undesirable hydrocarbon compounds or tars in an insoluble form, thereby allowing removal of these constituents from the final liquid smoke. Thus, by this procedure, the wood constituents previously considered desirable by the manufacturers of liquid smoke are absorbed into the solution in a balanced proportion and the undesirable constituents may be removed. The resultant liquid smoke solution still contains a significant concentration of tars because the manufacturers and users consider the dark colored tars to be necessary from the standpoint of imparting smoke color, odor and flavor to foodstuffs. This smoke solution is representative of the whole spectrum of wood-derived smoke colors and flavors that are available. The apparatus and method for manufacturing typical liquid smokes of the preferred type is more fully described in U.S. Pat. Nos. 3,106,473 to Hollenbeck and 3,873,741 to Melcer et al.

As used herein, the term "at least partially neutralized" is intended to refer to liquid smoke compositions having a pH greater than about 4, preferably having a pH within the range of from about 5 to about 9, and more preferably having a pH within the range of from about 5 to about 6.

It has been found that the commercially available liquid smoke solutions are generally highly acidic, as discussed previously, and that they may, therefore, interfere with peelability of the casings if a peeling aid such as carboxymethyl cellulose is used. To alleviate this problem, a tar-depleted at least partially neutralized liquid smoke may be employed in the practice of this invention.

The tar-depleted liquid smoke may be applied to the external surface of the tubular casing by passing the casing through a bath of the tar-depleted liquid smoke composition. The liquid smoke is allowed to contact the casing prior to doctoring off any excess liquid smoke by passing the casing through squeeze rolls, or wipers, and the like, for an amount of time sufficient for the casing to incorporate the desired amount of smoke color, odor and flavor constituents. The process of passing the casing through a treatment bath, also referred to in the art as a "dip bath" or a "dip tank," may also be referred to in the art as a "dipping" step. The tar-depleted liquid smoke composition may alternatively be externally applied to the casing by methods other than dipping, such as spraying, brushing, roll-coating, and the like.

Alternatively, the tar-depleted liquid smoke composition may be applied to the internal surface of the casing by any of several well-known procedures described in U.S. Pat. No. 4,171,381 to Chiu, the disclosure of which is incorporated by reference. These include slugging or bubble coating, spraying, and coating while shirring. The slugging method for coating the inside of a casing involves filling a portion of the casing with the coating material, so that the slug of coating material generally resides at the bottom of a "U" shape formed by the casing being draped over two parallel rollers, and then moving the continuous indefinite length of casing so that the slug of coating material remains confined within the casing, while the casing moves past the slug and is coated on its inside wall by the coating material contained within the slug.

It may then be shirred by conventional methods, or prior to shirring, it may be dried and/or humidified to a water content suitable for shirring and/or further processing. The need for conventional drying and/or humidification after the preferably external tar-depleted liquid smoke treatment depends on the water content of the casing after treatment and the type of casing. If the casing is a non-fibrous casing, a water content within the range of from about 8 weight percent to about 18 weight percent water immediately before shirring is typical, and for fibrous casing a water content within the range of from about 11 weight percent to about 35 weight percent water immediately before shirring is typical, where percent is based on the total weight of casing including water.

Various organic solvents were tested as to their potential for extracting tars from as-purchased liquid smoke. The procedure was as follows. Various ratios of liquid smoke to solvent were prepared and thoroughly mixed. The sample was allowed to settle overnight in order to separate the lower solvent layer containing the extracted tars from the aqueous upper liquid smoke layer. After gravity separation, a 1 ml. aliquot of the reduced tar aqueous liquid smoke layer was mixed with 10 ml of water and its turbidity (transmittance at 590 nm, the wave length of light) was measured on a spectrophotometer. The higher the percent transmittance reading, the lower the residual tar concentration in the aqueous liquid smoke. As used herein, "light transmittance" of aqueous liquid smoke refers to the latter's intrinsic light transmittance without addition of materials which may significantly affect the percent light transmittance.

Figure 4:
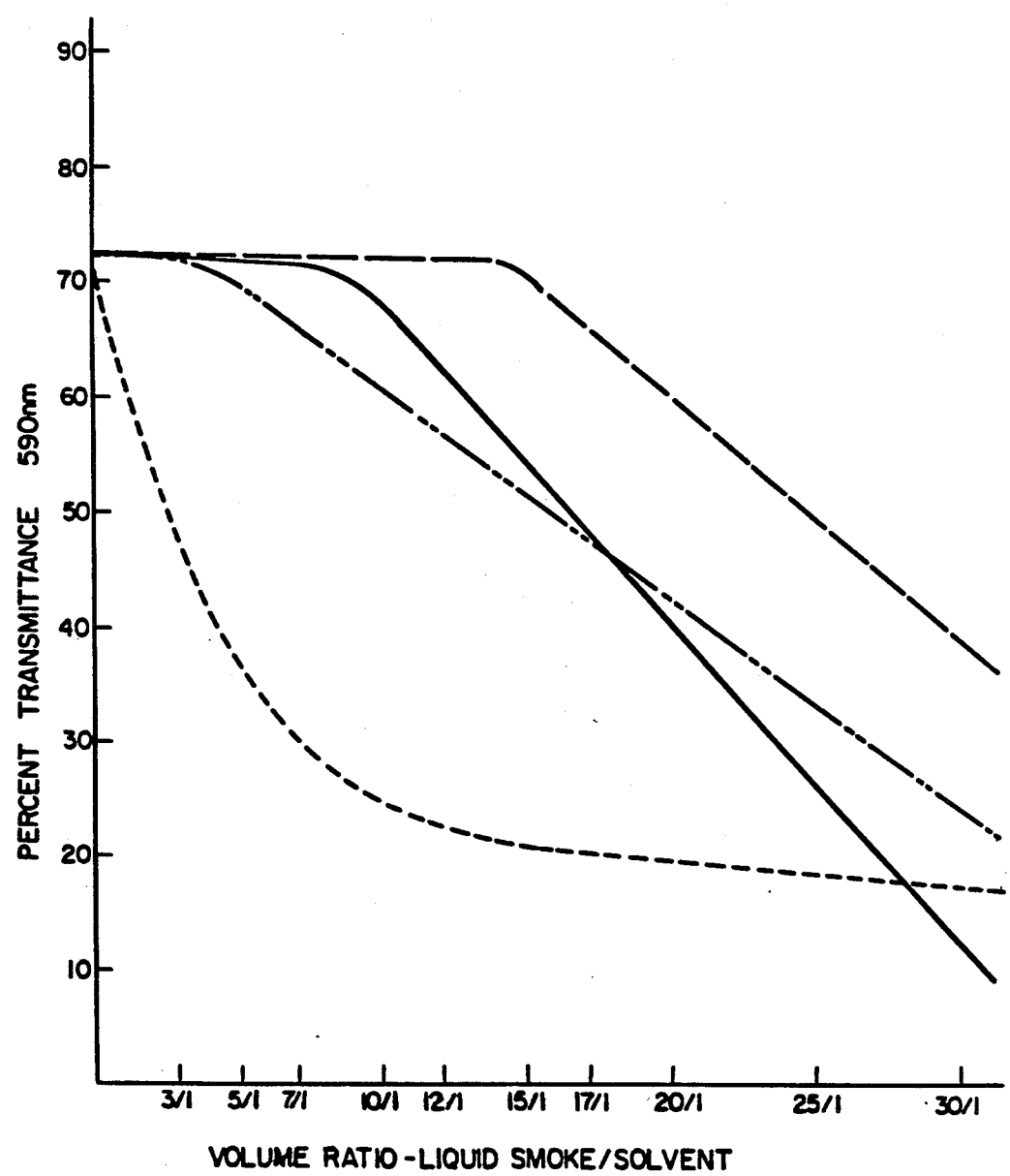
FIG. 4 is a graph showing percent light transmittance as a function of as-purchased liquid smoke to liquid solvent volume ratio for several halogen-containing organic liquid solvents: methylene chloride, bromochloromethane, chloroform and bromoform.

Four halogen-substituted methane liquid solvents were tested in the first series of solvent tests, and FIG. 4 is a series of graphs showing percent light transmittance as a function of the as-purchased liquid smoke to liquid solvent volume ratio for methylene chloride (solid line), bromochloromethane (long dash line), chloroform (dash-dot-dot-dash line), and bromoform (short dash line). In each instance the liquid smoke was "Royal Smoke AA" purchased from Griffith Laboratories.

It will be apparent from FIG. 4 that in general the highest levels of light transmittance are achieved with the greatest quantity of solvent relative to liquid smoke. In a preferred embodiment of this invention the reduced tar-content aqueous liquid smoke composition has at least 50% light transmittance, and the method for preparing the reduced-tar content composition requires use of a liquid smoke solution to liquid solvent volume ratio so as to provide a tar-depleted liquid smoke having at least 50% light transmittance. As illustrated in Table T and FIG. 13 (both discussed hereinafter), lower levels of light transmittance indicate that the preferred degree of tar removal from the as-purchased liquid smoke was not achieved. Using this light transmittance criteria, it appears that the suitable range of liquid smoke/liquid solvent volume ratio depends on the particular liquid solvent and the total acid content-absorptive power of the liquid smoke. It will be recognized that suitable solvents must be substantially immiscible with the liquid smoke for suitable extraction mechanics. Distinct layering of the two phases facilitates actual gravimetric separation. It will be recognized further that complete separation of the aqueous liquid smoke and the organic solvent is not possible and, depending on miscibility, a small amount of the organic solvent will remain in the aqueous liquid smoke. By way of illustration, about 1% by weight methylene chloride remains in the aqueous liquid smoke after the tar-containing fraction has been removed. Other data shows that methylene chloride is non-detectable in casings treated with reduced-tar compositions in accordance with this invention.

FIG. 4 demonstrates that with methylene chloride ($CH_2Cl_2$) as the organic solvent, the liquid smoke solution to methylene chloride volume ratio may be as high as about 7:1 without significant loss of transmittance, and as high as about 17:1 while still maintaining the preferred level of at least 50% transmittance. FIG. 4 also illustrates that with bromochloromethane ($CH_2BrCl$) as the organic solvent, the liquid smoke solution to bromochloromethane volume ratio may be as high as about 15:1 without significant loss of transmittance, and up to about 25:1 while still maintaining the preferred level of at least 50% transmittance. From FIG. 4 it is further apparent that with chloroform ($CHCl_3$) as the organic solvent, the transmittance continuously declines from the maximum value as the liquid smoke/chloroform ratio increases. This volume ratio should be between about 1:1 and about 16:1 to achieve the preferred transmittance of at least 50%. FIG. 4 shows that with bromoform ($CHBr_3$), only a very low volume ratio (between about 1:1 and about 3:1) is necessary to achieve the preferred at least 50% transmittance. Higher values could be achieved with multiple liquid extraction steps for this and any other suitable liquid solvent. That is, the aqueous liquid smoke fraction from a first liquid solvent extraction stage is mixed with additional liquid solvent and again separated into a further tar-depleted aqueous liquid smoke fraction and a tar-enriched liquid solvent fraction layer. It will be recognized that the practitioner may employ as many liquid extraction stages as needed to achieve the desired level of transmittance. Further, it will be understood that different suitable organic solvents may be used in multiple solvent extraction steps according to this invention, and that mixtures of solvents are suitable if the mixture possesses the previously defined requirement of hydrogen bonding parameter (at least 2.7) and immiscibility in the liquid smoke environment.

In a second series of solvent tests, other halogen substituted hydrocarbon solvents were tested for tar-depletion capability by measuring the resulting smoke compositions' transmittance using the aforesaid procedure. Various concentration admixtures of the solvents with the same as-is liquid smoke were tested and the results were correlated with hydrogen bonding parameters. These tests are summarized in Table A.

TABLE A

Liquid Smoke Transmittance of Halogenated Solvents

| | Hydrogen Bonding Parameter | Transmittance of Various Smoke/Solvent Volume Ratios | | | |
|---|---|---|---|---|---|
| | | 1/1 | 5/1 | 10/1 | 20/1 |
| Methyl iodide ($CH_3X$) | — | — | 0 | 0 | 0 |
| 1,2-dichloroethane ($CH_2ClCH_2Cl$) | 4.43 | 64 | 33 | 26 | 26 |
| 1,2,3-trichloropropane ($ClCH_2CHClCH_2Cl$) | 3.29 | 70 | — | — | — |
| 1,1,1-trichloroethane ($Cl_3CCH_3$) | — | 0 | 0 | 0 | 0 |
| 1,2-dichloroethylene ($ClHC:CHCl$) | 1.09$^a$ | 0 | 0 | 0 | 0 |
| trichloroethylene ($Cl_2C:CHCl$) | 2.14 | — | 0 | 0 | 0 |
| carbon tetrachloride ($CCl_4$) | about 1.5$^a$ | 0 | 0 | 0 | 0 |
| 1,1-dichloroethane ($Cl_2HCCH_3$) | 2.74 | 24 | 4 | 4 | 12 |

$^a$calculated from relationships described in "Tables of Solubility Parameters", K. L. Hoy, Union Carbide Corporation, 1975.

Inspection of Table A reveals that of the tested halogen-substituted hydrocarbon liquids, only those possessing hydrogen bonding parameters above about 2.7 are suitable for use in this invention. The tested liquids below this value produce extracted liquid smokes having light transmittance values which are either unacceptably low or zero.

Figure 5:
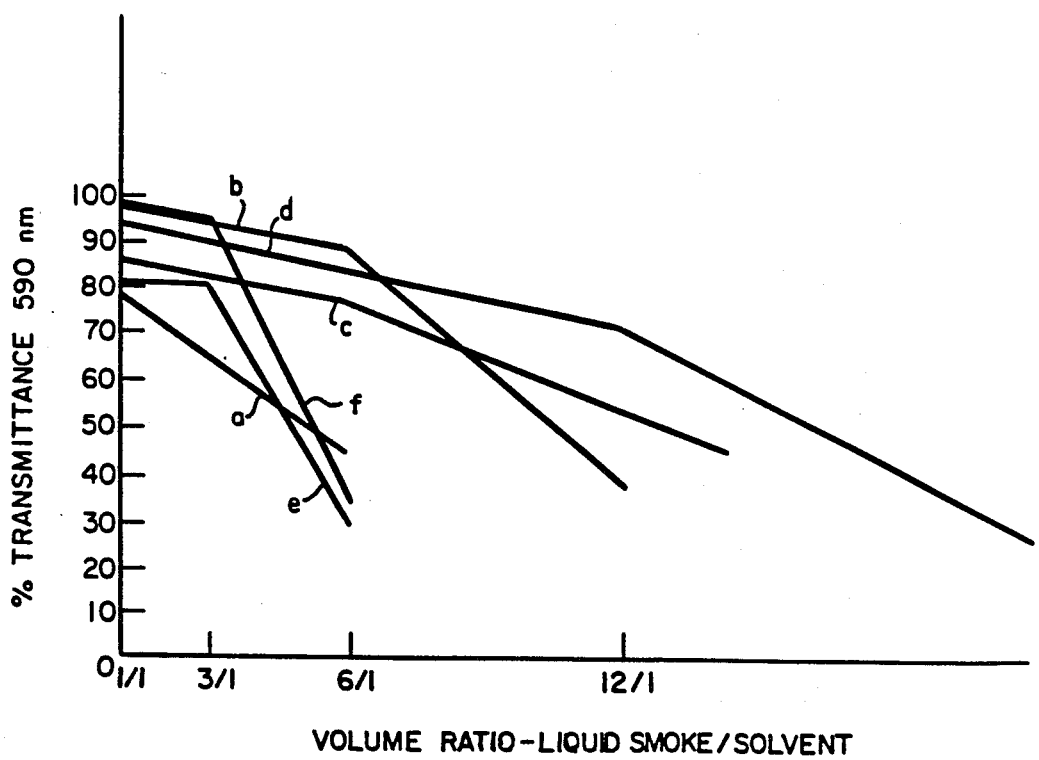
FIG. 5 is a graph showing percent light transmittance as a function of as-purchased liquid smoke to liquid solvent volume ratio for various non-halogenated alcohols.

In another series of experiments, a group of non-halogenated alcohol liquids were tested as to their potential for extracting tars by the aforedescribed spectrophotometric procedure and at various liquid smoke/solvent ratios using as-purchased Royal Smoke AA. These volume ratios ranged from 1:1 to over 12:1, depending on the particular alcohol liquid, and the results are summarized in the graphs of FIG. 5. In these graphs percent light transmittance is shown as a function of the as-purchased liquid smoke to solvent volume ratio for six alcohols identified by the following letters: (a) B 2-ethylhexanol, (b) hexyl CELLOSOLVE, or the monohexyl ether of ethylene glycol, sold by Union Carbide Corporation, 270 Park Avenue, New York City, (c) n-octyl alcohol, (d) n-hexyl alcohol, (e) n-butyl alcohol, and (f) phenyl CELLOSOLVE, the phenyl ether of ethylene glycol also sold by Union Carbide Corporation. FIG. 5 demonstrated that each of these alcohol solvents is useful in the practice of this invention over a particular range of liquid smoke to solvent ratios, and the ranges vary depending on the solvent. By way of illustration, the practitioner may use FIG. 5 to select a Royal Smoke AA to n-octyl alcohol volume ratio between about 1:1 and 13:1 to practice this invention because the resulting tar-depleted liquid smoke has light transmittance of at least about 50%. Higher liquid smoke to liquid solvent ratios result in unacceptably low light transmittance percentages.

It has been indicated that organic liquid solvents useful in this invention must have a hydrogen bonding solubility parameter of at least about 2.7. As used herein, this parameter or character of the solvent may be calculated from known literature or experimental vapor pressure data such as the heat or vaporization at 25° C. The total solubility parameter ($u_T$) may be determined using the relationship of Equation (1).

$$\delta_T = \left[ \frac{(\Delta H_{25} - RT)d}{M} \right]^{\frac{1}{2}} \quad (1)$$

where:
$H_{25}$=Heat of vaporization of 25° C.
R=Gas constant
T=Temperature
d=Density at 25° C.
M=Molecular weight The total solubility parameter value is separated into its hydrogen bonding ($\delta_H$) or polar ($\delta_p$) and nonpolar ($\delta_{np}$) constituents. The following relationships are useful for determining the hydrogen bonding parameter value ($\delta_H$).

$$\log \alpha = 3.39066 \, T_b/T_c - 0.15848 - \log M/d \quad (2)$$

where:
$\alpha$=Aggregation number
$T_b$=Boiling point in degrees absolute
$T_c$=Critical temperature in degrees absolute
M=Molecular weight
d=Density $$\delta_H = \delta_T \sqrt{\frac{\alpha - 1}{2}} \quad (3)$$

The theoretical basis for use of solubility characteristics is discussed in the literature. Tabulation of parameters have been published in works by C. M. Hansen, "The Three Dimensional Solubility Parameter and Solvent Diffusion Coefficient," Danish Technical Press, 1967, Copenhagen. The hydrogen bonding solubility parameters listed herein were obtained exclusively from the compilation by K. L. Hoy, "Tables of Solubility Parameters", Union Carbide Corporation, 1975. This may be obtained from Union Carbide Corporation, Chemicals and Plastics Division, River Road, Bound Brook, N.J. 08805.

The aforedescribed spectrophotometric procedure was employed to measure the percent light transmittance for a variety of organic liquids having different hydrogen bonding solubility parameters using as-purchased Royal Smoke AA, at a smoke to solvent volume ratio of 1:1. The results of these tests are summarized on Table B and the graph of FIG. 6.

TABLE B

| Solvent | H-Bonding Parameter | % Light Transmittance |
|---|---|---|
| Acids | | |
| 2-Ethylhexanoic acid | 5.68 | 11.3 |
| Alcohols | | |
| 2-Ethylhexanol | 5.85 | 79.2 |
| Hexyl CELLOSOLVE | 5.90 | 98.2 |
| n-Octyl alcohol | 6.08 | 87.2 |
| n-Hexyl alcohol | 6.68 | 94.6 |
| n-Butyl alcohol | 7.55 | 81.0 |
| Phenyl CELLOSOLVE | 7.84 | 99.4 |
| Aldehydes | | |
| Propionaldehyde | 5.38 | 86.8 |
| Alkanes | | |
| Decane | 0 | 0 |
| Octane | 0 | 0 |
| Hexane | 0 | 0 |
| 2,2-Dimethylbutane | 0 | 0 |
| Cyclohexane | 0 | 0 |
| Amines | | |
| Tri-n-butylamine | 1.93 | 0.2 |
| Aromatics | | |
| n-Butylbenzene | 0 | 0 |
| Cumene | 0 | 0.6 |
| Toluene | 0.80 | 0.3 |
| p-Xylene | 0.97 | 0 |
| Esters | | |
| 2-Ethylhexyl acetate | 2.62 | 16.3 |
| Butyl acetate | 3.30 | 87.5 |
| Ethyl acetate | 4.35 | 92.5 |
| Ethers | | |
| Isopropyl ether | 0.75 | 0.2 |
| n-Butyl ether | 2.20 | 0 |
| Ethyl ether | 2.73 | 74.2 |
| Halogenated | | |
| Perchloroethylene | 0 | 0 |
| Butyl chloride | 1.71 | 0 |
| Chloroform | 3.09 | 88.2 |
| Methylene chloride | 4.70 | 86.4 |
| Ketones | | |
| Isophorone | 1.55[a] | 97.0 |
| Diisobutyl ketone | 1.88 | 36.7 |
| Methyl isobutyl ketone | 2.88 | 92.2 |
| Acetophenone | 4.03 | 98.0 |
| MEK/toluene[b] | 2.71 | 74.8 |
| MEK/2-ethylhexanol[b] | 5.23 | 91.4 |

[a]value is 2.7 if equilibrium concentration of enol is 35 mol %.
[b]methyl ethyl ketone present in 50 weight % concentration.

Figure 6:
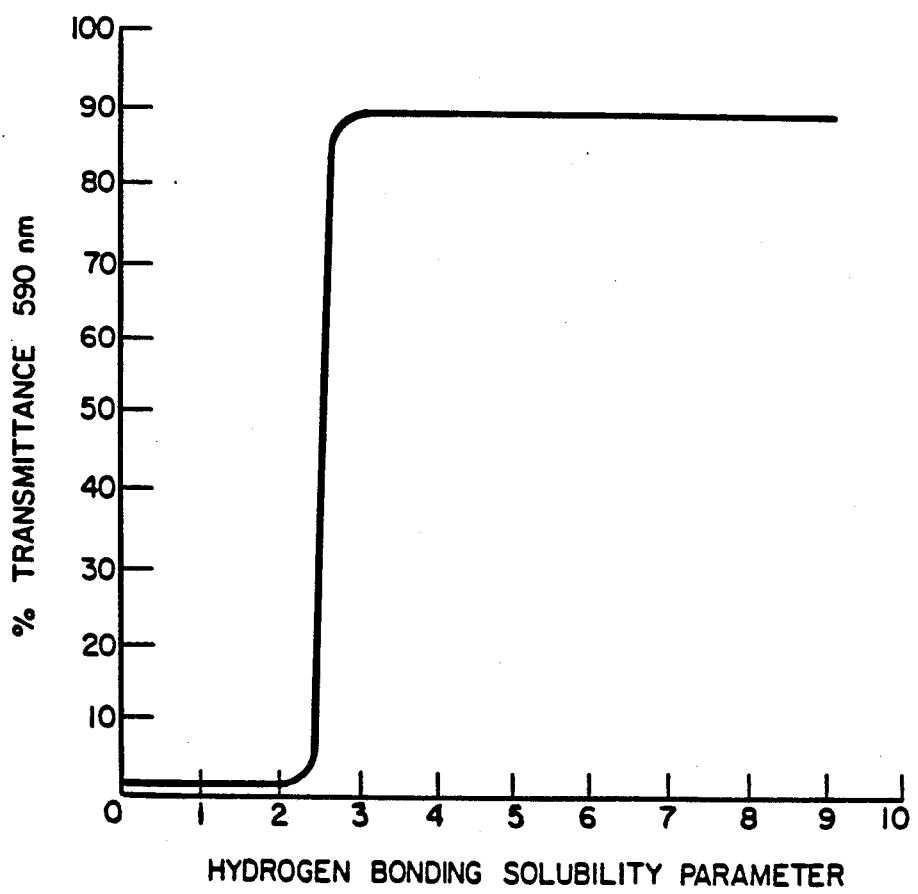
FIG. 6 is a graph showing percent light transmittance as a function of hydrogen bonding solubility parameter for various organic liquid solvents at a volume ratio of 1:1 of as-purchased liquid smoke to solvent.

Inspection of FIG. 6 reveals that there is a sharp increase (almost vertical slope) in the percent light transmittance for the tested organic solvents as the H-bonding solubility parameter is increased in the region of about 2.7. While this phenomenon is not fully understood, it appears to be due to the threshold type interaction of the solvent with the tar components resulting in preferential solubility of such components. This solubility is related to the solvent's physico-chemical character and can be predicted by the measured hydrogen bonding parameter value if significantly above 2.7. For organic liquids having H-bonding solubility parameter values of about 2.7, the solvent effectiveness for extraction of liquid smoke tars is very sensitive, and should be determined by experiment. For example, Table C (discussed hereinafter) shows that ethyl ether ($\delta_H$ 2.73) performs adequately while Table A shows that 1,1-dichloroethane ($\delta_H$ 2.74) is by itself unsatisfactory for use in a single extraction step according to this invention. Accordingly, it appears that in this threshold transition between acceptable and nonacceptable solvents, some anomalies may occur with respect to function and H-bonding solubility parameter value.

Referring to Table B, one exception to the hydrogen bonding solubility parameter-percent light transmittance relationship is isophorone, which has a low H-bonding parameter of 1.55, but which produces an extracted liquid smoke having a high light transmittance of 97.0%. A probable explanation is that in the acidic medium of Royal Smoke AA, one would expect a significant concentration of the enol by way of equilibrium. As calculated by the aforedescribed procedure, the H-bonding solubility parameter for the enol is 4.8, so that if the enol is present at 35 mol % (65 mol% isophorone), the H-bonding parameter for the two tautomers is 2.7. Such an enol concentration is reasonable for this system.

Referring again to Table B, another exception to the hydrogen bonding solubility parameter-percent light transmittance relationship is 2-ethylhexanoic acid, which has a high hydrogen bonding parameter of 5.68 but a low light transmittance of only 11.3%. One possible explanation as to its failure to function adequately, considering its high hydrogen bonding parameter, could be dimerization in the acidic environment of the liquid smoke. The hydrogen bonding parameter of such a dimer may be much lower than the value reported for the monomer.

It has also been determined that the required H-bonding parameter of at least about 2.7 (and preferably at least 50% light transmittance indicating effective tar removal) may be achieved by mixing of at least two organic liquids, one being miscible with the liquid smoke and having a H-bonding parameter of greater than about 2.7, and another having an unsatisfactory low (or even negligible) H-bonding parameter and insoluble in the liquid smoke. By way of illustration, in the Table B-FIG. 6 tests, methyl ethyl ketone (MEK) was found to be miscible with the tar-containing liquid smoke at a liquid smoke/solvent volume ratio of 1:1. Also, toluene did not extract the tars from the liquid smoke and has a H-bonding parameter of 0.80. However, a 50/50 (by weight) mixture of MEK and toluene has a calculated H-bonding parameter of 2.71 and demonstrated a 74.8% light transmittance of the liquid smoke upon extraction with the mixture.

In still another series of experiments, the Table B group of organic liquids were tested for percent light transmittance at higher smoke to solvent volume ratios by the same spectrophotometric procedure using as-purchased Royal Smoke AA. These liquid smoke to solvent volume ratios were 3:1, 6:1, 12:1 and 24:1; the results are summarized in Table C and the FIG. 7 graph.

Inspection of Table C reveals that at a liquid smoke to solvent ratio (also referred to herein as the extraction ratio) of 3:1, for most solvents the percent light transmittance was similar to or slightly less than for an extraction ratio of 1:1. In general, the suitability of the solvent for use in the present invention is the same for the two extraction ratios, i.e., the solvent provides the preferred light transmittance (for extracted liquid smoke) above 50% for both ratios or below 50% for both ratios as defined by the H-bonding parameter of about 2.7. There are three exceptions to this generalization: propionaldehyde, ethyl ether, and the mixture of MEK/2-ethylhexanol.

Table C also indicates that at liquid smoke to solvent ratio of 6:1 and higher, some of the solvents which were suitable at lower extraction ratios are no longer suitable, whereas others remain suitable. By way of illustration, chloroform and methylene chloride are suitable at high extraction ratios whereas ethyl acetate provides light transmittance of only 4.5% at an extraction ratio of 6:1. One reason for this observed phenomena is the solvent's solubility in water and, hence, its anticipated solubility in the liquid smoke, and the relationship is defined for purposes of this invention by reference to the sum total of the H-bonding solubility parameter plus the weight percent solvent solubility in water when the extraction ratio is greater than about 6:1. More specifically, the sum total should not exceed about 9 or the water solubility of the solvent is too high for practicing the invention, as demonstrated by percent light transmittance below about 50%. Referring again to chloroform and methylene chloride, because of their low water solubility, their sum totals are 3.9 and 6.0, respectively, and both have high light transmittance values of 80.4% and 82.0% at an extraction ratio of 24:1. Therefore, they are suitable for practicing this invention at high ratios. In contrast, ethyl acetate has a sum total of 12.4 because of high water solubility, and a low light transmittance of only 4.5% at an extraction ratio of 6:1. Therefore, ethyl acetate is not suitable for practicing this invention at high extraction ratios.

Figure 7:
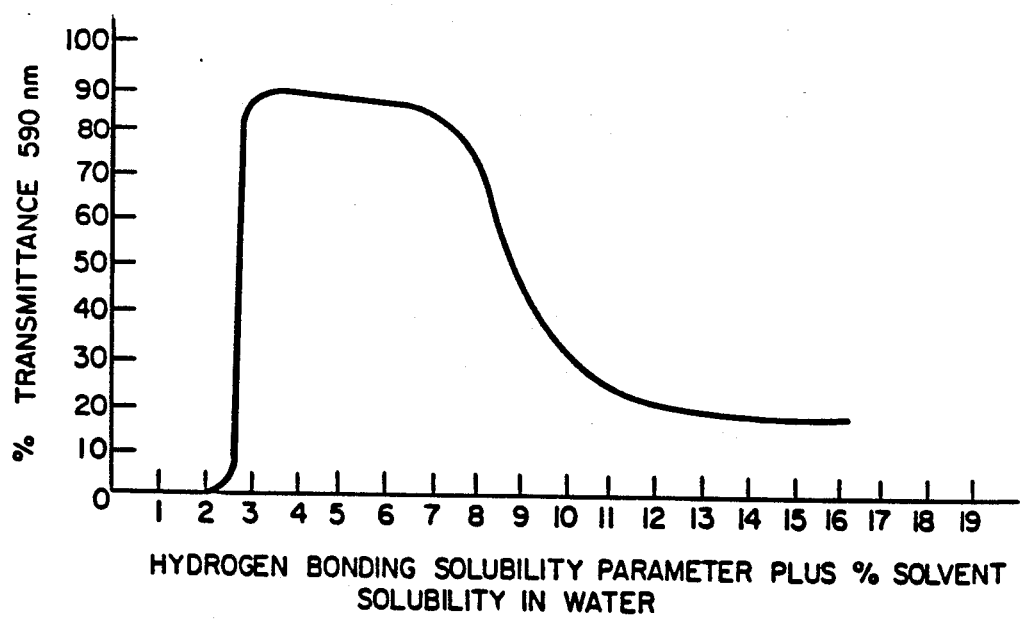
FIG. 7 is a graph showing percent light transmittance as a function of the sum total of hydrogen bonding solubility parameter plus percent solvent solubility in water, for various organic liquid solvents at a volume ratio of 6:1 of as-purchased liquid smoke to solvent.

FIG. 7 shows that the percent light transmittance is relatively constant at a very high level of at least 85% for sum totals between about 2.7 and about 7, and then declines at progressively increasing rates through at least 8. The percent light transmittance drops below about 50% for sum totals exceeding about 9, and solvents having the latter characteristic are not suitable for practicing the invention.

Reviewing the FIG. 5 graphs of certain alcohol solvents in the context of the H-bonding parameter plus water solubility sum total as set forth in Table C, it will be noted that five of the six alcohols satisfy this relationship, but 2-ethylhexanol does not. Even though its sum total is only 5.9, it demonstrates an unacceptably low light transmittance of 44.8% at an extraction ratio of 6:1. The reason for this exception to the previously defined sum total-extraction ratio relationship is not understood, but may be due to steric considerations.

TABLE C

| | Characteristics of Selected Extraction Solvents | | | | | | |
|---|---|---|---|---|---|---|---|
| | Solubility* | | % Light Transmittance at Extraction Ratio of | | | | |
| Solvent | in H$_2$O | H-Bond | 1/1 | 3/1 | 6/1 | 12/1 | 24/1 |
| Acids | | | | | | | |
| 2-Ethylhexanoic acid | .1 | 5.68 | 11.3 | 7.0 | — | — | — |
| Alcohols | | | | | | | |
| 2-Ethylhexanol | .07 | 5.85 | 79.2 | 63.1 | 44.8 | 39.2 | Suspension |
| Hexyl CELLOSOLVE | 0.99 | 5.90 | 98.2 | 93.2 | 89.5 | 55.0 | 11.6 |
| n-Octyl alcohol | .05 | 6.08 | 87.2 | 80.4 | 77.6 | 72.0 | 25.2 |
| n-Hexyl alcohol | .71 | 6.68 | 94.6 | 90.0 | 87.7 | Soluble 0.0 | — |
| n-Butyl alcohol | 7.45 | 7.55 | 81.0 | 81.0 | 30.8 | Partly Soluble 0.6 | — |
| Phenyl CELLOSOLVE | 3 | 7.84 | 99.4 | 96.0 | 33.0 | — | — |
| Aldehydes | | | | | | | |
| Propionaldehyde | 2.2 | 5.38 | 86.8 | 48.8 | — | — | — |
| Alkanes | | | | | | | |

TABLE C-continued

| | Characteristics of Selected Extraction Solvents | | | | | | |
|---|---|---|---|---|---|---|---|
| | Solubility* | | % Light Transmittance at Extraction Ratio of | | | | |
| Solvent | in H₂O | H-Bond | 1/1 | 3/1 | 6/1 | 12/1 | 24/1 |
| Decane | — | 0.0 | 0.0 | 0.0 | — | — | — |
| Octane | — | 0.0 | 0.0 | 0.0 | — | — | — |
| Hexane | — | 0.0 | 0.0 | 0.0 | — | — | — |
| 2,2-Dimethylbutane | .01 | 0.0 | 0.0 | 0.0 | — | — | — |
| Cyclohexane | .01 | 0.0 | 0.0 | 0.0 | — | — | — |
| Cyclopentane | .02 | 0.29 | 0.0 | 0.0 | — | — | — |
| Amines | | | | | | | |
| Tri-n-butylamine | .01 | 1.93 | 0.2 | — | — | — | — |
| Aromatics | | | | | | | |
| n-Butylbenzene | .50 | 0.0 | 0.0 | 0.0 | — | — | — |
| Cumene | — | 0.0 | 0.6 | 0.0 | — | — | — |
| Toluene | .06 | 0.80 | 0.3 | 0.3 | — | — | — |
| p-Xylene | .02 | 0.97 | 0.0 | 0.0 | — | — | — |
| Esters | | | | | | | |
| 2-Ethylhexyl acetate | .03 | 2.62 | 16.3 | 3.3 | — | — | — |
| Butyl acetate | .43 | 3.30 | 87.5 | 83.6 | 81.0 | 59.6 | — |
| Ethyl acetate | 8.1 | 4.35 | 92.5 | 76.0 | 4.5 | Soluble | — |
| Ethers | | | | | | | |
| Isopropyl ether | 1.2 | 0.75 | 0.2 | 0.1 | — | — | — |
| n-Butyl ether | .03 | 2.20 | 0.0 | 0.0 | — | — | — |
| Ethyl ether | 6.04 | 2.73 | 74.2 | 24.0 | — | — | — |
| Halogenated | | | | | | | |
| Perchloroethylene | .01 | 0.0 | 0.0 | 0.0 | — | — | — |
| Butyl chloride | .11 | 1.71 | 0.0 | 0.0 | — | — | — |
| Chloroform | .81 | 3.09 | 88.2 | 87.9 | 90.2 | 88.4 | 80.4 |
| Methylene chloride | 1.30 | 4.70 | 86.4 | 88.8 | 90.1 | 91.7 | 82.0 |
| Ketones | | | | | | | |
| Isophorone | 1.2 | 1.55 | 97.0 | 94.2 | 95.4 | 85.4 | 18.4 |
| Diisobutyl ketone | .05 | 1.88 | 36.7 | 10.2 | 1.3 | — | — |
| Methyl isobutyl ketone | 1.7 | 2.88 | 92.2 | 90.2 | 82.8 | 49.2 | Suspension |
| Acetophenone | .55 | 4.03 | 98.0 | 94.4 | 96.8 | 92.8 | 45.2 |
| Methyl ethyl ketone | 24 | 4.63 | | Soluble | | | |
| MEK/Toluene | | 2.72 | 74.8 | 15.2 | | | |
| MEK/2-Ethylhexanol | | 5.25 | 91.4 | 77.2 | 28.8 | | |

*Weight percent in water at 20-25° C.

Figure 8:
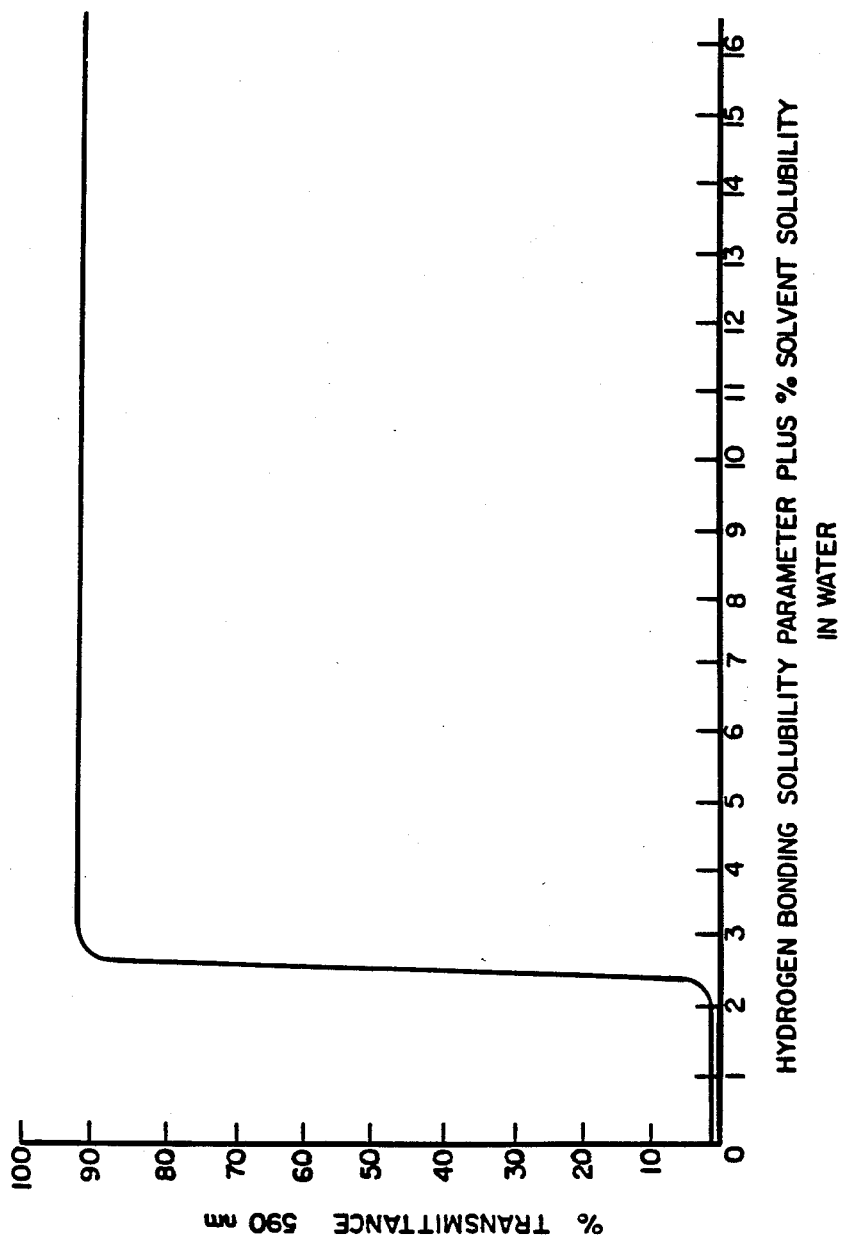
FIG. 8 is a graph showing percent light transmittance as a function of the sum total of hydrogen bonding solubility parameter plus percent solvent solubility in water, for non-reactive and certain reactive organic liquid solvents at a volume ratio of 1:1 of as-purchased liquid smoke to solvent.

FIG. 8 is a graph showing the percent light transmittance for the organic liquids of Tables B and C, as a function of the sum total of the H-bonding solubility parameter plus the weight percent solvent solubility in water for an extraction ratio of 1:1 (liquid smoke to solvent volume ratio). As with the H-bonding parameter alone (FIG. 6), the light transmittance rises almost vertically at a sum total of about 2.7, and remains at a very high level of about 90% for sum totals at least as high as 15. Unlike the FIG. 7 graph for 6:1 extraction ratio, the light transmittance for the 1:1 extraction ratio does not decline at sum totals above about 7.

Another group of solvents were tested for light transmittance by the same spectrophotometric procedure for light transmittance, using extraction ratios of 1:1, 3:1 and/or 6:1 and as-purchased Royal Smoke AA. The data from these tests is summarized in Table D. Inspection of Table D reveals that most of the organic liquids performed the extraction in accordance with the previously discussed relationship of extraction ratio and sum total of H-bonding solubility parameter and weight percent solubility in water.

TABLE D

| | Characteristics of Selected Extraction Solvents | | | | |
|---|---|---|---|---|---|
| | Solubility[a] | H-Bonding | % Light Transmittance at Extraction Ratio of | | |
| Solvent | in H₂O | Parameter | 1/1 | 3/1 | 6/1 |
| Isobutyric acid | 22.8 | 7.91 | miscible | 92.0 | 77.4 |
| Amyl alcohol | 1.7 | 7.17 | — | 95.1 | 33.1 |
| Benzyl alcohol | 3.5 | 7.62 | — | 72.8 | 6.2 |
| Isobutyraldehyde | 6.5 | 4.08 | — | — | — |
| Di(2-ethylhexyl)amine | 0.02 | 2.35 | 89.8 | — | — |
| Benzene | 0.18 | 1.98 | 6.8 | — | — |
| 2-Methyl-2-pentene | 0.01[b] | 1.66 | 0 | — | — |
| 2-Methyl-1-pentene | 0.01[b] | 1.57 | 0 | — | — |
| 2-Butyl acetate | 0.62 | 2.43 | 85.0 | — | — |
| Isobutyl acetate | 0.67 | 2.50 | 86.4 | 86.4 | 70.6 |
| Isopropyl acetate | 2.9 | 2.79 | — | — | — |
| Ethyl butyrate | 0.49 | 3.11 | 82.1 | 49.8 | 0 |
| Ethyl acetoacetate | 12.0 | 4.98 | — | — | — |
| 2,5-Dimethylfuran | 0.13 | 2.35 | 0.5 | — | — |
| Bromotrichloromethane | | 1.50 | 0.8 | 78.0 | — |
| 1,2-Dichloroethane | 0.81 | 4.43 | — | 82.9 | — |
| 1,1,2-Trichloroethane | 0.43 | 3.40 | — | miscible | — |

TABLE D-continued

| | Characteristics of Selected Extraction Solvents | | | | |
|---|---|---|---|---|---|
| | Solubility[a] | H-Bonding | % Light Transmittance at Extraction Ratio of | | |
| Solvent | in H$_2$O | Parameter | 1/1 | 3/1 | 6/1 |
| Cyclopentanol | 29 | 4.29 | — | — | — |

[a]Weight percent in water at 20-25° C.
[b]Estimated.

Another requirement of organic liquids suitable for use in this invention as single constituent solvents is that they be nonreactive and immiscible with the tar-containing liquid smoke or, if reactive, the resulting derivative solvent must also be immiscible in the tar-containing liquid while possessing the necessary criterion of at least about 2.7 H-bonding parameter value in the liquid smoke environment. Two types of reactive solvents have been included in the preceding Tables C and D data. They are the organic acids and amines.

A group of organic liquids generally unsuitable for use in this invention as single constituent solvents are the alkyl amines. In the lower pH environment of tar-containing liquid smoke, an acid-base exothermic reaction occurs and the resulting quaternary salt usually becomes more soluble than its precursor. Phase distinction is lost, hence extraction is not possible as demonstrated by tri-n-butylamine (Table C). However, with certain amines such as di-(2-ethylhexyl)amine, experimental observations show that the immiscibility remains high between the resulting derivatives quaternary salt solvent and the tar-containing liquid smoke solution. Also, since the hydrogen bonding capability of the quaternary salt is known to be higher than its precursor, the derivative solvent is believed to have a hydrogen bonding solubility parameter which is higher than 2.35 (the Table D value for the precursor) and most likely above about 2.7. For these reasons, the quaternary salt derivative solvent of di-(2-ethylhexyl)amine in the liquid smoke environment is a suitable single constituent solvent.

When considering use of the reactive type of solvent, the practitioner should insure that the desired chemical balance of the liquid smoke is not upset by the solvent reaction. It is possible that certain reactive solvents may form derivatives which are functionally suitable, but adversely alter the liquid smoke's coloring and flavoring characteristics. For this reason, it is preferred to use the nonreactive type of organic liquid solvent in the practice of this invention.

One method of treating the casing with the tar-depleted liquid smoke of this invention is shown in FIG. 1. In FIG. 1, a flattened, tubular, cellulosic sausage casing 10, is externally treated with a tar-depleted liquid smoke composition during its passage over lower and upper guide rolls 13 through dip tank 11 which contains the tar-depleted liquid smoke composition 12. The casing passes over lower and upper guide rolls 14 after exiting the dip tank, and then passes between squeeze rolls 20 which minimize any excess carry-over of the liquid smoke composition. The total contact time of the casing 10 with the tar-depleted liquid smoke composition 12 in the dip tank 11, and with excess liquid smoke composition on the casing passing over the guide rolls 14 before the casing passes through the squeeze rolls 20, will determine the amount of smoke color, odor and flavor constituents of the tar-depleted liquid smoke composition that the casing will incorporate. The total contact time is measured from point A to point B in FIG. 1. After the casing passes through squeeze rolls 20, it passes over guide roll 23 and is wound up on reel 24. The casing is then sent on to conventional further processing, including conventional humidification, as may be required, and conventional shirring.

Figure 2:
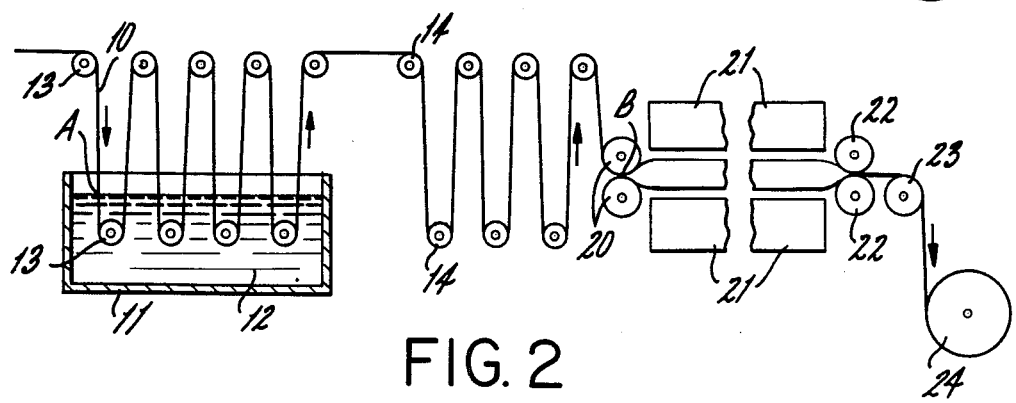
FIG. 2 is a schematic view of apparatus similar to and performing the same functions as the FIG. 1 apparatus, but with a chamber for partially drying the tar-depleted liquid smoke treated casing to a desired moisture content while in an inflated condition.

The embodiment illustrated in FIG. 2 differs from that illustrated in FIG. 1, in that in FIG. 2 the casing after passing through squeeze rolls 20 is passed into a heating and drying chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device, such as circulating hot air chambers, which will dry the sausage casing to the proper moisture content. After the casing passes out of the heating chamber 21 and through squeeze rolls 22, it passes over guide roll 23 and is wound up on reel 24. The casing is then sent on to conventional further processing, including conventional humidification, as may be required, and conventional shirring.

Figure 3:
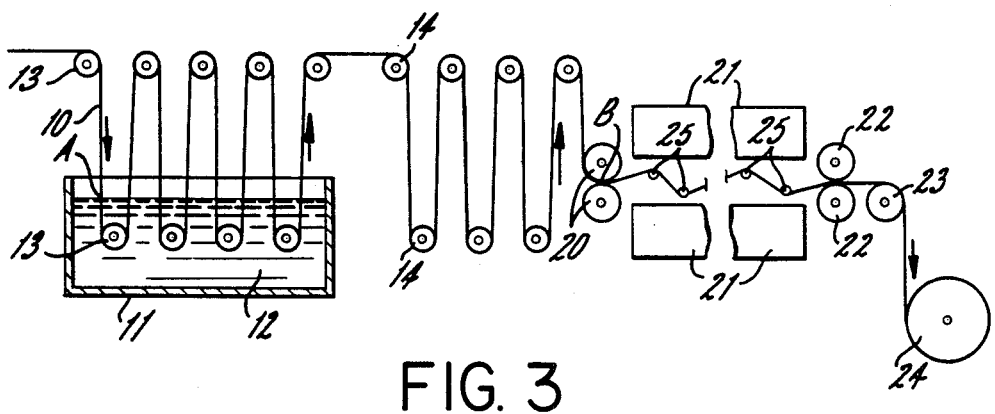
FIG. 3 is a schematic view of apparatus similar to and performing the same function as the FIG. 2 apparatus but with means for partial drying of the tar-depleted liquid smoke treated casing while in a flat condition.

The embodiment illustrated in FIG. 3 differs from that illustrated in FIG. 2, in that in FIG. 3 the casing is dried in a flat condition while passing over guide rolls 25.

It is to be noted that the tar-depleted liquid smoke which is coated on the casing surface, whether externally coated or internally coated, does not exist solely as a surface coating. Smoke color, odor and flavor constituents which are coated on the surface penetrate the cellulosic structure of the casing as the cellulose absorbs the moisture of the smoke solution. Inspection of the cross-section of the casing wall discloses a color gradation across the casing wall, with the smoke treated surface having a darker color than the surface on the opposite side of the casing wall. Accordingly, as used herein, the term "coating" is to be understood to mean that the casing wall is not only coated with smoke constituents but that the casing wall is also impregnated with smoke constituents.

The tar-depleted liquid smoke compositions of the present invention may also contain other ingredients which may be suitably used in treating a tubular food casing, to which the smoke constituents are applied, e.g., glycerine and/or propylene glycol which may be used as humectants or softening agents, and the like.

Other ingredients which are normally used in the manufacture of, or for further treatment of the food casings, e.g., cellulose ethers and mineral oil, may also be present in the casing if desired, and they may be used in the same manner and amounts as if the tar-depleted liquid smoke treatment had not been used.

In particular, agents for improving the peelability of the casings from food products such as sausages, e.g. frankfurters, bolognas and the like, may be optionally coated on the internal surface of the casings before or after the external application of tar-depleted liquid smoke to the casing, and before or during shirring. If the tar-depleted liquid smoke is applied to the casing internal surface, the peelability agent is preferably applied first. Such peelability enhancing agents include, but are not limited to, carboxymethyl cellulose and other water soluble cellulose ethers, the use of which is disclosed in U.S. Pat. No. 3,898,348 issued Aug. 5, 1975 to Chiu et. al., the disclosure of which is incorporated herein by reference; "Aquapel", a Hercules, Inc. trademarked product comprising alkyl ketene dimers, the use of which is further disclosed in U.S. Pat. No. 3,905,397 issued Sept. 16, 1975 to H. S. Chiu, the disclosure of which is incorporated herein by reference; and "Quilon", an E. I. Dupont de Nemours Co., Inc. trademarked product comprising fatty acid chromyl chlorides, the use of which is further disclosed in U.S. Pat. No. 2,901,358 issued Aug. 25, 1959 to W. F. Underwood et al., the disclosure of which is incorporated herein by reference.

The peelability enhancing agent may be applied to the internal surface of the tubular food casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827 to Bridgeford.

Casings prepared using the method of this invention are also suitable for the processing of what is conventionally known in the art as "dry sausages." Unlike other types of non-fibrous and fibrous casings which are preferably easy to peel from the food product, either by the food processor before sale to the customer or by the consumer, "dry sausage" casing preferably adheres to the food product during and after processing. "Kymene," a Hercules, Inc. trademarked product which is a polyamide epichlorohydrin resin, the use of which is further disclosed in U.S. Pat. No. 3,378,379 issued Apr. 16, 1968 to Shiner et al., the disclosure of which is incorporated herein by reference, may optionally be internally coated on the internal surface of a casing treated with tar-depleted liquid smoke by the method of this invention, to improve the adhesion of the casing to food products processed therein.

The invention will now be more clearly understood by reference to the following example which are set forth as being merely illustrative of the invention and which are not intended, in any manner, to be limitative thereof. Unless otherwise indicated, all parts and percentages are by weight and all casing related percentages are based on the total weight of the casing.

EXAMPLE I

This example illustrates the preparation of a liquid smoke composition of this invention. To 0.47 gallons (1.8 liters) of methylene chloride was added 4.7 gallons (18 liters) of as-purchased (as-is) liquid smoke solution "A" ("Royal Smoke AA" from Griffith Laboratories, Inc. having an absorptive power of about 0.6 at 340 nm), and the liquids were then thoroughly mixed by repeated inverting of the container. The methylene chloride containing the tars was separated from the liquid smoke by gravity, i.e., the tar-enriched methylene chloride lower layer was drained off until the tar-depleted liquid smoke upper layer appeared as detected by visual observation. The resulting aqueous liquid smoke composition was substantially tar-free as determined by a qualitative water compatibility test in which a sample of the liquid smoke was mixed with water and observed for tar precipitation or lack thereof. The pH of a portion of the aqueous liquid smoke composition was then adjusted to 5.0 by adding a sufficient amount of a 50% NaOH solution to the smoke solution. The pH of a sample of as-is liquid smoke was similarly adjusted to 5.0. The chemical compositions of the four liquid smoke solutions involved in this Example I are shown in Table E. The total acid content was measured by the steam distillation-titration procedure desribed hereinafter. Phenol and carbonyl determinations for liquid smoke solutions are made by the following procedures.

Determination of Phenol and Carbonyl Content of Liquid Smoke

For sample preparation, all samples are filtered through Whatman No. 2 filter paper or equivalent, and refrigerated upon receipt or after preparation until the time of analysis to avoid possible polymerization. Distilled water is used for all dilutions. The samples are diluted with water in two steps, beginning with a 10 ml. quantity. In the first step the dilution is to a total volume of 200 ml., and in the second step 10 ml. of the first solution is further diluted to a total volume of 100 ml. For phenol determination, 5 ml. of the second solution is further diluted in a third step with distilled water to a total volume of 100 ml. For carbonyl determination, 1 ml. of the second solution is further diluted with carbonyl-free methanol to a total volume of 10 ml.

For the phenol determination, the reagents are:
1. Boric acid-potassium chloride buffer pH 8.3. Dilute the indicated quantities of the solution to 1 liter with water.
   0.4M boric acid—125 ml.
   0.4M potassium chloride—125 ml.
0.2M sodium hydroxide—40 ml.
2. 0.6% NaOH
3. Color reagent—N-2,6-trichloro-p-benzoquinoneimine Stock solution: dissolve 0.25 gm. in 30 ml. methanol and keep in refrigerator.
4. 2,6-dimethoxyphenyl standards Prepare solutions of 1 to 7 micrograms/ml. of DMP in water for standard curve.

This procedure for phenol determination is a modified Gibbs method based on the procedure described in Tucker, I. W. "Estimation of Phenols in Meat and Fat", JACAC, XXV, 779 (1942). The reagents are mixed together in the following order:
1st—5 ml. of pH 8.3 buffer.
2nd—5 ml. of dilution of unknown diluted liquid smoke, or of standard 2,6-dimethoxyphenol solution, or 5 ml. of water for blank.
3rd—Adjust pH to 9.8 using 1 ml. of 0.6% NaOH.
4th—Dilute 1 ml. of color reagent stock solution to 15 ml. in water. Add 1 ml. of diluted color reagent. Prepare just before adding.
5th—Allow color to develop for exactly 25 minutes at room temperature.
6th—Determine absorbance at a wave length of 580 nm in a 1 cm colorimeter tube with a Spectronic 20 or equivalent.
7th—Prepare a standard curve using absorbance as the abscissa and standard concentrations as the ordinate. Extrapolate concentration of DMP in liquid smoke dilutions from this curve.

8th—Calculate mg DMP/ml liquid smoke using the following equation:

$$\frac{\text{ppm DMP (from std. curve)} \times (\text{dilution factor}) \times 0.001 \text{ mg/}\mu\text{g}}{\text{ml of original liquid smoke sample}} = \text{mg DMP/ml liq smoke}$$

To calculate mg DMP/g liquid smoke, divide result of above equation by the weight (g) of 1 ml of liquid smoke.

For carbonyl determination, the reagents are:

1. Carbonyl-free methanol. To 500 ml. of methanol add 5 gm. of 2,4-dinitrophenylhydrazine and a few drops of concentrated HCl. Reflux three hours, then distill.
2. 2,4-dinitrophenylhydrazine solution. Prepare saturated solution in carbonyl-free methanol using twice recrystallized product. Store in refrigerator and prepare fresh every two weeks.
3. KOH solution. 10 gm. in 20 ml. of distilled $H_2O$, diluted to 100 ml. with carbonyl-free methanol.
4. 2-butanone standard. Prepare solutions of 3.0 to 10 mg. of 2-butanone in 100 ml. carbonyl-free methanol for a standard curve.

The procedure is a modified Lappan-Clark method based on the procedure described in their article "Colorimetric Method for Determination of Traces of Carbonyl Compounds", Anal. Chem. 23, 541–542 (1959). The procedure is as follows:

1st—To 25 ml. volumetric flasks containing 1 ml. of 2,4-dinitrophenylhydrazine reagent (prewarmed to insure saturation) add 1 ml. of diluted liquid smoke solution, or 1 ml. of standard butanone solution, or 1 ml. of methanol (for reagent blank).

2nd—Add 0.05 ml. of concentrated HCl to all 25 ml. flasks, mix contents of each, and place in water bath for 30 minutes at 50° C.

3rd—Cool to room temperature and add 5 ml. KOH solution to each.

4th—Dilute contents of each flask to 25 ml. with carbonyl-free methanol.

5th—Read at 480 nm against methanol blank set at absorbance of 0, (curvettes—0.5×4 inches (10.2 cm) or equivalent). Use Spectronic 20, or equivalent.

6th—Plot absorbance versus 2-butanone (MEK) concentration in mg. per 100 ml. for standard curve.

7th—Prepare a standard curve using absorbance as the abscissa and standard concentrations (mg MEK/100 ml) as the ordinate. Extrapolate concentration of MEK in liquid smoke dilutions from this curve.

8th—Calculate mg MEK/100 ml liquid smoke by the following equation:

$$\frac{\text{mg MEK (from std curve)} \times \text{dilution factor}}{100 \text{ ml}} = \text{mg MEK/100 ml liq smoke}$$

To calculate mg MEK/g liquid smoke, divide the result of the above equation by the weight (in grams) of 100 ml of smoke.

TABLE E

Chemical Comparison* of Commercially Available Liquid Smoke and Aqueous Liquid Smoke Composition of this Invention

| Sample No | | Phenols mg/g | Carbonyls mg/g | Total Acid Content % |
|---|---|---|---|---|
| $E_1$ | As-is liquid smoke A (pH 2.4) | 5.2 | 71 | 11.5 |
| $E_2$ | Tar-depleted Aqueous liquid smoke composition A (pH 2.4) | 2.3 | 33 | 8.3 |
| $E_3$ | As-is liquid smoke A after neutralization (pH 5.0) | 3.4 | 93 | 10.5 |
| $E_4$ | Tar-depleted Aqueous liquid smoke composition A after neutralization (pH 5.0) | 2.1 | 15 | 8.8 |

*Numbers are arithmetic averages of multiple determinations.

Table E shows that the aqueous liquid smoke composition prepared in accordance with this invention has a substantially different chemical character from the as-is tar-containing aqueous liquid smoke. On a weight basis, the tar-depleted compositions of Table E, samples $E_2$ and $E_4$, have less than about one-half of the phenol content of the tar-containing aqueous liquid smoke composition from which they are derived (Sample No. $E_1$), and this represents a preferred composition of the invention. While the data in Table E shows that the extraction does substantially alter the total acid content and the carbonyl concentration, other test work indicates that no conclusion can be drawn from my work regarding the effect of extraction upon total acid content or carbonyl concentration. While the practice of this invention greatly reduces the phenolic component concentration in a liquid smoke composition, it does not adversely affect the composition's protein staining (color development) ability, or its natural odor or flavor attributes, as demonstrated by ensuing Examples.

It is also apparent from visual inspection of samples of the Table E compositions that those embodying this invention contain substantially less high molecular weight tars, since they are noticeably lighter in color. Additionally, they are totally miscible with water.

EXAMPLE II

This example illustrates the treatment of a non-fibrous cellulose food casing by the method of this invention with liquid smoke components of Example I as well as with "Charsol C-10", purchased from Red Arrow Products Co. and having an absorptive power of about 0.4 at 340 nm., the latter being identified in Table F as smoke B and liquid smoke composition B. The liquid smoke composition B was made from smoke B (Charsol C-10) by a solvent extraction method which was performed in a manner identical to the extraction of Example I.

Several non-fibrous frankfurter size gel stock casings were treated with the neutralized (pH 5.0) aqueous liquid smoke compositions $E_3$ and $E_4$ prepared in Example I by applying the liquid smoke solutions to the external surfaces of the casings. Similarly, gel stock casings were treated by applying neutralized as-is smoke B and tar-depleted smoke composition B. The liquid smoke loading was about 10 mg./in.$^2$ (1.55 mg/cm$^2$) casing surface in each instance.

The applicator was a device which uniformly distributed the aqueous liquid smoke solution around the casings and comprised two main parts: the liquid smoke applicator and the smoothing unit. The smoke applicator consisted of a stationary foam disc mounted such that liquid smoke entered at the outer edge. Tiny flexible plastic tubes conducted the liquid to the center core where the inflated casing was passed through. The foam disc flexed with casing sizes, thereby making it suitable for a range of casing cross-sectional areas. Because the liquid smoke application is not precisely uniform, a rotating smoothing device was used immediately after the applicator. It comprised a rotating foam disc with a core size suitable for the casing size being processed. The disc was driven by an air motor at 200 to 250 rpm. Excess liquid smoke from the applicator and from the smoothing device was collected in a common sump and returned to the applicator inlet. The treated casings were moved through a point-support type assembly to and through a drying section. The aforedescribed coating and casing movement assembly is not part of the present invention but is claimed in previously referenced copending application Ser. No. 261,457 entitled "Liquid Coating Method and Apparatus", filed May 7, 1981 in the names of Chiu et al, now U.S. Pat. No. 4,356,218, and incorporated herein to the extent pertinent.

The treated casings were dried at 80° C. to a water content of 12 weight percent. The casings were then conventionally moisturized to 14-18 weight percent water, and shirred. The levels of the smoke compositions, the phenols, carbonyls and total acid content present in the treated casings are shown in Table F. The total acid content of the casings was measured by the steam distillation titration procedure discussed hereinafter. Measurement of phenol and carbonyl contents in smoke treated casing is determined by procedures which are also discussed hereinafter.

TABLE F

| Casing No | Casing Description | Phenols mg/100 cm$^2$ | Carbonyls mg/100 cm$^2$ | Total Acid Content mg/100 cm$^2$ |
|---|---|---|---|---|
| F$_1$ | Treated with Sample E$_3$ | 0.25 | 2.5 | 9.6 |
| F$_2$ | Treated with Sample E$_4$ | 0.077 | 10.5 | 10.8 |
| F$_3$ | Treated with as-is smoke B after neutralization (pH 5.0) | 0.20 | 12.2 | 10.1 |
| F$_4$ | Treated with tar-depleted aqueous liquid smoke composition B after neutralization (pH 5.0) | 0.046 | 1.24 | 9.3 |

Chemical Comparison* of Non-Fibrous Cellulose Casings Treated in Accordance with Invention

*Numbers are arithmetic averages of multiple determinations.

One embodiment of the tar-depleted smoke colored and smoke flavored casing to this invention may be characterized as a casing having a tar-depleted smoke coating which has less than one-half the phenol content (on the basis of weight per unit area of treated casing surface) that a casing has when coated with the tar-containing aqueous liquid smoke composition from which the tar-depleted aqueous liquid smoke was derived. The Table F data are specific examples in which the casing of this invention coated with tar-depleted liquid smoke composition A had only about one-third the phenol content of the casing coated with partially neutralized tar-containing liquid smoke solution A. Similarly, casing coated with tar-depleted liquid smoke composition B had less than about one-fourth the phenol content of the casing coated with partially neutralized tar-containing liquid smoke solution B.

Because of the nature of these experiments, the phenol reduction in the liquid smoke (Table E) and the phenol reduction in the coated casing (Table F) are not proportionate. As in the case of Table F, no conclusion can be drawn from my work with respect to the effect of this invention on carbonyl content or acid content of the casing.

Examples III and IV show the treatment of non-fibrous cellulose casing by the method of this invention when using the substantially neturalized aqueous liquid smoke composition A of Example I with a peelability enhancing agent.

EXAMPLE III

Several non-fibrous frankfurter size casings were treated as in Example II (Royal Smoke AA-derived solutions and methylene chloride extraction of tars), except that a solution containing propylene glycol, mineral oil, a polyoxyethylene sorbitan ester (commercially designated as "Tween 80" and purchased from Atlas Chemical Industries), and 0.85 weight percent sodium carboxymethyl cellulose ("CMC") was thereafter spray coated on the interior surface of the casing during shirring at a delivery rate of 3.5 mgs/sq. in. (0.54 mg/cm$^2$) casing surface to improve the peelability characteristics of the casings. The pH of the aqueous liquid smoke compositions (liquid smoke compositions A of Example I) used in these experiments was adjusted by the addition of a 50% NaOH solution to achieve a pH of 3.2 or greater as shown in Table G.

TABLE G pH Adjustment of Solvent Extracted Liquid Smoke

| Sample No. | Solution pH |
|---|---|
| CMC-8 | Untreated control |
| CMC-9 | Sample E$_2$ (pH 2.4) |
| CMC-10 | 3.2 |
| CMC-11 | 4.1 |
| CMC-12 | 5.0 |
| CMC-15 | 5.1 |
| CMC-13 | 6.1 |
| CMC-14 | 7.0 |

The tar-depleted smoke colored casing samples of Table G were stuffed with a high collagen-content meat emulsion having the formulation of Table H. The stuffed casings were then processed by the conventional steps of cooking, cold water showering and chilling, but without the conventional step of smoke treatment. Processing conditions were sufficient to cause the transfer of smoke color, odor and flavor constituents from the casing to the encased frankfuters. The casings were peeled from the finished frankfurters on a High Speed Apollo Ranger Peeling Machine, and Table I shows that these casings peeled 100% where the pH was at least 4.1. This means that all frankfurters were separated from their casing at machine peeling speed without mechanical jamming of the peeling machine and without scarring of frankfurter surface. Table I also shows that each of the samples had generally superior calorimetric values as compared with the control sample CMC-8. All samples showed superior darkness (the "L" value), but Sample CMC 14 had lower redness (the "a" value) due to a relatively high solution pH of 7.0. Frankfurters processed in accordance with this invention have demonstrated an acceptable smoke flavor.

TABLE H

| Frankfurter Formulation | |
|---|---|
| Ingredients | Weight (kg) |
| Beef Chuck | 9.98 |
| Beef Tripe | 7.26 |
| Beef Shank | 7.26 |
| Beef Cheek | 7.26 |
| Regular Pork | 13.61 |
| Water | 9.98 |
| BSalt | 1.13 |
| Seasoning | 0.45 |
| Sodium Nitrite (Prague Powder) | 0.11 |

Colorimetric values in Table I were obtained using a Gardiner XL-23 Colorimeter with a 1 cm aperture opening standardized with a white plate, all in accordance with the standard operating procedures described in the instruction manual for the Gardiner XL-23 Tristimulus Colorimeter, which is commonly used in industry for the measurement of color. Three locations on each of 10 frankfurters from each treatment were selected for readings. Reading locations were approximately 1 inch (2.54 cm) from each frank end and in the middle. Colorimetric "L" and "a" values were collected.

ity enhancing agent. The improved peelability with low pH (2.4) tar-depleted liquid smoke may be related to the non-ionic character of the methylcellulose ethers.

TABLE J

| Sample No. | Type of Methocel |
|---|---|
| MC-23 | K-3 (hydroxypropyl methylcellulose) |
| MC-24 | A-5 (methylcellulose) |
| MC-25 | E-5 (hydroxypropyl methylcellulose) |
| MC-26 | A-15 (methylcellulose) |
| MC-27 | K-100 (hydroxypropyl methylcellulose) |

Summarizing Examples III and IV, Table I shows that non-fibrous cellulose casings treated with the tar-depleted aqueous liquid smoke composition in accordance with this invention should also be treated with peelability enchancing agents. The Table I data also show that frankfurters processed in a non-fibrous cellulose casings treated with a tar-depleted aqueous liquid smoke composition in accordance with this invention have darker and redder surface colors than the frankfurters processed in the untreated casing, CMC-8.

Objective criteria have been used for comparison of the protein staining (color development) ability of the tar-depleted aqueous liquid smoke composition of this invention with the tar-containing liquid smoke from which it is derived. These criteria include the "Staining

TABLE I

| | Colorimetric Values[1] | | | | Peelability | | | |
|---|---|---|---|---|---|---|---|---|
| Sample | L* | Std. Dev. | a** | Std. Dev. | Total No. Franks | No. Franks Peeled | No. Franks Unpeeled | % Peelability |
| CMC-8 | 47.14 | 1.02 | 14.79 | .48 | 64 | 64 | 0 | 100 |
| CMC-9 | 45.29 | 0.74 | 15.68 | .34 | 96 | 0 | 96 | 0 |
| CMC-10 | 45.32 | 0.73 | 15.84 | .41 | 112 | 4 | 108 | 4 |
| CMC-11 | 46.26 | 1.12 | 15.17 | .34 | 96 | 96 | 0 | 100 |
| CMC-12 | 44.55 | 1.02 | 15.29 | .32 | 104 | 104 | 0 | 100 |
| CMC-13 | 46.02 | 1.11 | 15.14 | .37 | 120 | 120 | 0 | 100 |
| CMC-14 | 44.68 | 1.03 | 14.59 | .59 | 112 | 112 | 0 | 100 |
| CMO-15 | 45.67 | 1.10 | 16.04 | .30 | 112 | 112 | 0 | 100 |
| MC-23 | 44.71 | 0.91 | 16.66 | .27 | 112 | 112 | 0 | 100 |
| MC-24 | 45.11 | 1.07 | 16.14 | .27 | 112 | 34 | 78 | 30 |
| MC-25 | 44.39 | 1.01 | 16.79 | .24 | 112 | 92 | 20 | 82 |
| MC-26 | 44.47 | 1.05 | 16.21 | .48 | 112 | 92 | 20 | 82 |
| MC-27 | 46.96 | 1.01 | 16.17 | .42 | 120 | 118 | 2 | 98 |

[1]Colorimetric values represent 3 measurements for each frank (beginning, middle, and end) and 10 franks per sample.
*L values represent light vs. darkness. The lower the value the more dark the sample.
**a values represent redness. The higher the values the more red the sample.

EXAMPLE IV

Non-fibrous frankfurter size gel stock casings were treated with tar-depleted liquid smoke composition $E_2$ of Example 1, and then the inner surfaces thereof were coated with various peelability enhancing agents. The peelability enhancing agents were various types of water soluble methylcellulose ethers sold by the Dow Chemical Company. The particular methylcellulose ethers used with the various samples are listed in Table J. These casings were then stuffed with high collagen meat emulsion as in Example III. The stuffed casings were processed and peeled, and the colorimetric and peelability data for the resulting frankfurters is summarized in Table I as "MC" samples. All samples demonstrated relatively good colorimetric values. The samples also showed improved peelability compared to sample CMC-9 which was prepared without a peelability Power" as applied to the liquid compositions themselves, and the "Staining Index" as applied to the coating on the tubular food casing. In each instance, the tested embodiments of this invention demonstrated substantially the same staining ability as the original tar-containing liquid smoke, yet the tar content had been reduced to a level such that the heretofore experienced tar problems had been eliminated. Staining index is a reliable criterion for measuring the color development ability in casings of this invention which are freshly made, but as hereinafter discussed, staining index should not be used with aged casing. The procedure used for measuring staining power and staining index is discussed below.

Staining Power and Staining Index Procedure

This procedure has as its basis the reaction encountered in meat processing in which the meat protein reacts with the smoke components imparting a desirable dark smoked color to the product. To quantify this staining or darkening power, the unknown smoke or smoke products are reacted with a specific amino acid (glycine) under acidic conditions at 70° C. for thirty minutes. The absorbance of the solution is measured at 525 nm. This procedure can be run on liquid smoke or liquid smoke treated casing with reproducible results. The detailed procedure is as follows:

I. Prepare a 2.5% solution of glycine in 95% acetic acid.
  (a) Dissolve 12.5 g of glycine in 25 ml of water in a 500 ml volumetric flask. Add enough glacial acetic acid to facilitate the dissolution.
  (b) Dilute to the prescribed level with glacial acetic acid.
II. In the case of liquid smoke analysis, weigh into a 15 ml test tube vial, 15–20 mg (±0.1 mg) of the liquid smoke to be evaluated, or
III. In the case of smoke treated casing analysis, punch out four double thickness discs from the test casing to yield a casing area of 2.0 in$^2$ (12.9 cm$^2$) for the eight discs.
  (a) If the casing is shirred, inflate a section with 10 psi (68,900 Pascals) air to smooth the surface. Collapse the casing by drawing it over a hard surface, punch out the discs and add them to the vial.
IV. To the vials containing either the liquid smoke or the treated casing, add 5.0 ml of the 2.5% glycine/acetic acid solution.
V. Cap the vials, hand shake to assure contact of the sample, and place in a 70° C. oven or constant temperature bath for thirty minutes.
VI. Measure the absorbance at 525 nm for each solution using the glycine reagent as a blank.
VII. The absorbance is reported as the staining power of the smoke or the staining index of the smoked casing. The numerical values for Staining Index as summarized in Table K indicate the absorbance per 2 square inches (12.9 cm$^2$) of casing surface.

The staining power represents the ability of a liquid smoke quantity to develop a certain absorbance or color under the staining index procedure, i.e., units of absorbance per mg. of liquid. In these tests the liquid smoke composition loading on the non-fibrous cellulose food casing was 6.9 mg/in$^2$ 1.1 mg/cm$^2$ of casing surface. Staining Power values were determined for the same four liquid compositions listed in Table E, and staining indices were measured on the coated casing listed in Table F. The results of these protein staining tests are summarized in Table K.

It should be noted that in the aforementioned experiments in which tar-depleted liquid smoke compositions were neutralized after solvent extraction, neutralization was performed without controlling the temperature of the aqueous solution during neutralization. The heat of solution substantially increases this temperature to a level as high as 55°–60° C. from an initial temperature on the order of 20° C. It has been discovered that the staining power of the resulting at least partially neutralized aqueous liquid smoke is somewhat diminished because of the elevated temperature, and this diminishment may be partially avoided by maintaining the temperature below about 40° C. during neutralization. When such controlled temperature neutralization is practiced, the staining power does not decline to nearly the same extent, and this discovery is described and claimed in my previously referenced U.S. Pat. No. 4,431,032 entitled "Tar Depleted Liquid Smoke Treatment of Food Casings", filed contemporaneously with this application.

Another advantage of combining the present invention with the controlled temperature neutralization of the aforementioned application is that the amount of required solvent may be minimized. That is, by first neutralizing the as-is liquid smoke under controlled temperature conditions, the tar precipitate is formed and a tar-depleted supernatant liquid is then contacted with a solvent in accordance with the present invention for further tar depletion. This sequence has been used in experiments similar to those reported in Tables E and F, and the results of same are included in Table K as sample K5 (tar-depleted liquid smoke) and sample K10 (casing treated with tar-depleted liquid smoke).

It will be observed from Table K that the Staining Power and Staining Index for these samples are the highest values of the neutralized tar-depleted samples, so that the sequence of controlled temperature neutralization followed by solvent extraction represents a preferred embodiment of this invention.

TABLE K

Protein Staining Ability

| Smoke Source | Sample No. | Smoke Description | Staining Power Absorbance/mg |
|---|---|---|---|
| E$_1$ | K$_1$ | As-is liquid smoke A (pH 2.4) (Sample E$_1$) | 0.034 |
| E$_2$ | K$_2$ | Tar-depleted aqueous liquid smoke composition A (Sample E$_2$) | 0.033 |
| E$_3$ | K$_3$ | As-is liquid smoke A after uncontrolled temperature neutralization (pH 5.0) | 0.024 |
| E$_4$ | K$_4$ | Tar-depleted aqueous liquid smoke A after uncontrolled temperature neutralization (pH 5.0) | 0.024 |
| — | K$_5$ | Tar-depleted aqueous liquid smoke A extracted after controlled temperature neutralization (pH 5.0) | 0.026 |

| Casing Sample No. | Casing Description | Staining Index Absorbance/Two in$^{2*}$ |
|---|---|---|
| K$_6$ | (as derived from Sample K$_1$) | 0.47 |
| K$_7$ | (as derived from Sample K$_2$) | 0.46 |
| K$_8$ | (as derived from Sample K$_3$) | 0.33 |
| K$_9$ | (as derived from Sample K$_4$) | 0.33 |
| K$_{10}$ | (as derived from Sample K$_5$) | 0.36–0.41 |

*Absorbance/12.9 cm$^2$

EXAMPLE V

Another series of tests was performed which demonstrates the difference between as-is tar-containing liquid smoke and the tar-depleted liquid smoke of this invention, in terms of cellulose casing haze. Samples of casing with each type of liquid smoke incorporated therein were immersed in water. During this period, the incorporated tar components are insolubilized by the water. In the case of the tar-depleted samples, no incompatibility was measured, but with the tar-containing samples the tar precipitated in or on the casing, and water incompatibility in the form of a cloudy haze in the casing was measured quantitatively.

More specifically, Royal Smoke AA liquid smoke was applied in a quantity of about (1.55 mg/cm$^2$) 10 mg/in$^2$ to the external surface of a 21 mm. diameter cellulose casing having a carboxymethylcellulose ("CMC")—based coating on the internal surface for improved peelability. For the samples produced by practicing this invention, the as-is liquid smoke was first contacted with methylene chloride liquid solvent in a volume ratio of 10:1 liquid smoke solution to liquid solvent. After mixing, the solution was allowed to stand for a period of 12 to 16 hours to form the two layers, and the separated tar-depleted liquid smoke upper layer was partially neutralized to a pH of 5.0 and incorporated on the cellulose casing external surface by the Example III procedure.

The treated casings were shirred and 36 inch (91.4 cm) long samples were taken randomly from a de-shirred stick, inflated with air to minimize shirring wrinkles, and immersed in 200 ml of deionized water. Immersion time was at least one hour but not more than three hours, the criterion being soaking for sufficient duration to achieve complete water penetration of the casing wall. After blotting the samples dry, casing haze was measured using the general procedure outlined in ASTM Method D 1003, Volume 35, "Haze and Luminous Transmittance of Transparent Plastics" (1977).

The results of these tests are summarized in Table L as follows:

TABLE L

| Type Casing | Casing Haze No. Determinations | Haze Range | Ave. Haze |
|---|---|---|---|
| Untreated (control) | 32 | 6.0–9.7% | 7.9% |
| Tar-Depleted Liquid Smoke | 28 | 5.4–8.7% | 6.6% |
| Tar-Containing Liquid Smoke | 32 | 8.5–13.1% | 10.7% |

It is apparent from Table L that the average haze for the as-is tar-containing liquid smoke treated cellulose casing, is substantially higher than the average haze for the tar-depleted liquid smoke treated cellulose casing of this invention, such that the latter is only about 61.6% of the former. Average haze values increase with increasing diameter because of the thicker casing wall. The absolute value for average haze also depends on the total acid content (or absorption power as discussed hereinafter) of the particular smoke and the amount of smoke incorporated in the casing (or absorption index also as subsequently discussed), but in general, the average haze for the cellulose casings of this invention are substantially lower than the average haze for cellulose casings treated with as-is liquid smoke, even though their coloring and flavor developing capabilities for encased foodstuffs are about the same when prepared under equivalent conditions. This relationship demonstrates the chemical and functional difference between the tar-depleted liquid smoke-treated cellulose casing of this invention, and the as-is liquid smoke treated casing.

The haze test is only useful in characterizing the cellulose casings and not the fibrous casing of this invention. This is because fibrous casings are inherently opaque and have a very high average haze, e.g., about 97.5% for untreated fibrous casings.

EXAMPLE VI

A series of tests was performed on aged casings of this invention which demonstrates that even though the staining index of the tar-depleted liquid smoke treated casings declines significantly from the staining indices of freshly prepared casings, surprisingly, the stuffed food product made by using the aged casings has smoke color equivalent in colorimeter value to product produced with fresh casing.

These aging tests included casings treated with as-is tar-containing liquid smoke under substantially identical conditions, and the staining index did not decline for such casings nearly to the extent that the staining index declined for the tar-depleted liquid smoke treated casings of this invention. This comparison demonstrates the chemical difference between the two types of casings.

In these tests Royal Smoke AA liquid smoke was applied to the external surface of 21 mm. diameter cellulose casings having a CMC-based coating on the internal surface for improved peelability. For the sample produced by practicing this invention, the as-is liquid smoke was first contacted with methylene chloride liquid solvent in a volume ratio of 10:1 liquid smoke solution to liquid solvent. After mixing, the solution was allowed to stand for a period of 12 to 14 hours to form the two layers. The separated tar-depleted liquid smoke upper layer was partially neutralized to a pH of 5 and incorporated on the cellulose casing external surface by the Example III procedure. Half of the casings were stuffed with a high collagen-content frankfurter meat emulsion very similar to the Table I formulation, and processed by the conventional steps of cooking, cold water showering and chilling, but without conventional smoke treatment. The other half of the casings was aged as set forth in Table M, and then they were used to produce frankfurters in the same manner. The results of these tests are summarized in Table M. The colorimetric values are obtained with the same equipment used in Example III and by the same procedure described in connection therewith.

It should be understood that the Table M data should not be compared quantitatively, because the initial staining indices ("Fresh S.I.") are different and different aging conditions were used. However, the data does qualitatively support the general relationship that stuffed food product made by using aged casings has smoke color which is unaffected by the casing age, notwithstanding the fact that the staining index of the casing declines with age.

EXAMPLE VII

A further series of ultraviolet absorption spectroscopy tests was performed using cellulose food casing treated with tar-depleted liquid smoke according to this invention, and the tar-containing as-is liquid smoke. These tests demonstrate the substantial difference between the two types of casings. The tests involved two different types of wood-derived liquid smokes: Charsol C-12, Royal Smoke AA, and Royal Smoke B, and in each instance the casing was 21 mm. diameter cellulose casing having a CMC-based coating on the internal surface for improved peelability. For Charsol C-12, the as-is liquid smoke was first contacted with methylene chloride liquid solvent in a volume ratio of 10:1 liquid smoke solution to liquid solvent and then allowed to stand for a period of 12 to 14 hours. For Royal Smoke AA, the as-is liquid smoke was first contacted with methylene chloride liquid solvent in a volume ratio of 10:1 liquid smoke solution to liquid solvent and then allowed to stand for a period of 12 to 14 hours. For Royal Smoke B, the as-is liquid smoke was first contacted with methylene chloride liquid solvent in a volume ratio of 15:1 liquid smoke solution to liquid solvent and then allowed to stand for a period of 12 to 14 hours. In each instance, the resulting two layers were separated and the upper layer was the tar-depleted liquid smoke having a pH of 2.4 which was used to treat the cellulose casing external surface in the manner described in Example III. The same treatment procedure was used with the three types of as-is liquid smokes also at a pH of 2.4.

TABLE M

Effect of Aging

| Type Casing | Smoke Loading mg/in$^2$ | Casing Fresh S.I. | ΔL** of Frankfurter from Fresh Casing | Type Aging | Casing Aged S.I. | ΔL** of Frankfurter from Aged Casing |
|---|---|---|---|---|---|---|
| Tar-Depleted Liquid Smoke | 10.5 | 0.62 | 2.87 | Accel.* | 0.32 | 3.36 |
| Tar-Containing Liquid Smoke | 10.2 | 0.42 | 5.21 | 3 months at 40° C. | 0.36 | 3.89 |

*Accelerated aging was at 50° C. for 72 hours.
**L values are frankfurter colorimetric measurements and ΔL is the difference (darker color) compared to a frankfurter sample not treated with liquid smoke.

The liquid smoke-treated casings were then subjected to the following procedure to obtain liquid samples suitable for obtaining the ultraviolet absorption spectrum in the 350 to 210 nm. range;

(a) A 100 in$^2$ (645 cm$^2$) sample of liquid smoke treated casing was submerged in 200 ml of anhydrous methanol for a period of about 1 hour and then removed.

(b) Depending on the liquid smoke loading, further dilution must be made for compatibility with the UV scanning equipment. In these instances the liquid smoke loading was 10 mg/in$^2$ (1.55 mg/cm$^2$) casing, and the solution used for scanning comprised 4.96 ml. of methanol and 0.10 ml. of the extract.

(c) The UV spectrum was recorded in the 350 to 210 nm. range with the following format: 2 second response/2 mm slit, 10 nm./cm. chart, 50 nm/minute scan speed, and 0–200% transmittance scale.

In order to measure the absorbance primarily due to tars present in the liquid smoke, the spectrophotometer was zeroed using an extract solution containing the lowest possible tar content. For any particular type of liquid smoke, this was an extracted and neutralized (pH 5.0) smoke treated casing extract sample. Once zeroed in this manner, any additional absorbance in the UV spectrum was a quantitative measure of the tarry components present.

Figure 9:
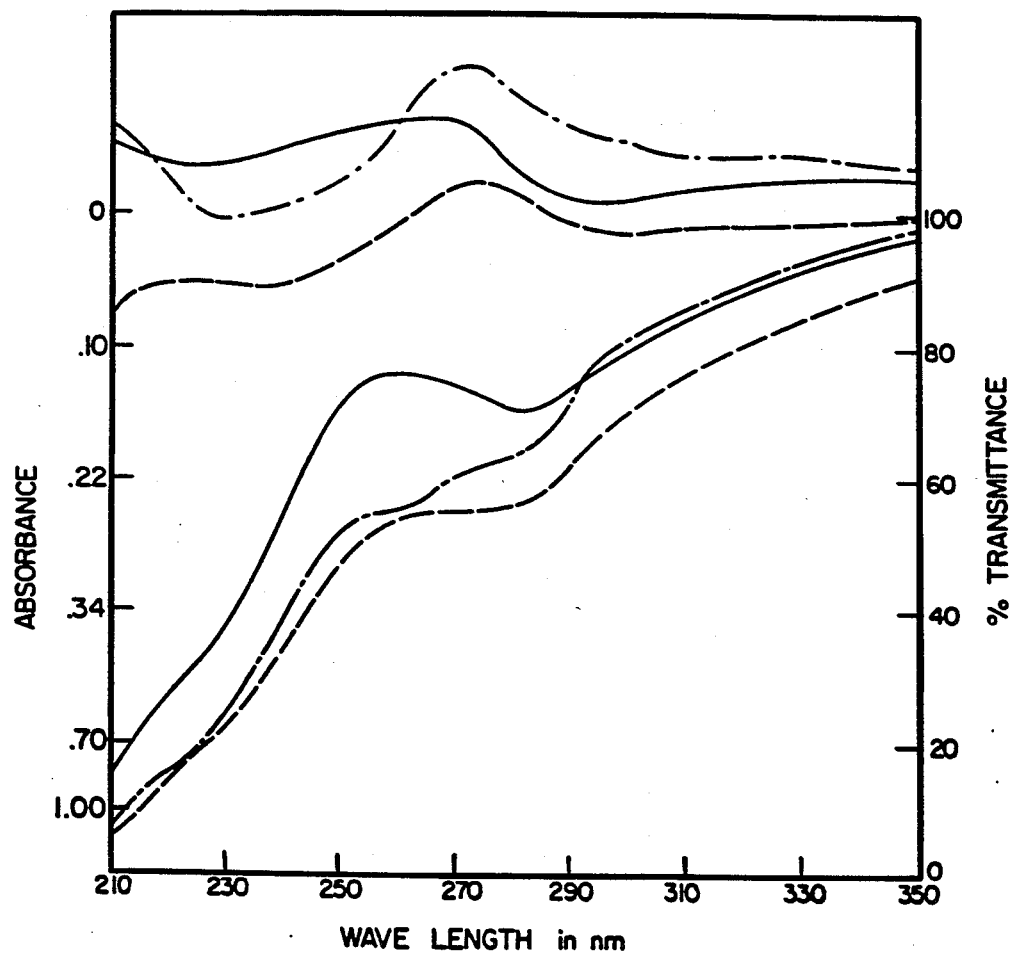
FIG. 9 is a graph showing ultraviolet transmittance and ultraviolet absorbance of casing extracts at various wave lengths for both as-is tar-containing liquid smoke treated casings and tar-depleted liquid smoke treated casings of this invention.

The results of these ultraviolet absorption tests are plotted in the FIG. 9 graph with the Charsol C-12 samples shown as solid lines, the Royal Smoke AA samples as dash lines, and the Royal Smoke B samples as dash-dot-dash lines. The greater than zero transmittance recorded in FIG. 9 is a function of the machine blank used in these particular experiments. Inspection of these curves reveals that the greatest difference between the tar-depleted samples (upper curves) and the tar-containing samples (lower curves) occurs at about 210 nm. wave length, although there is a substantial difference over the entire scanned range of wave lengths. The ultraviolet absorbance and percent light transmittance values at 210 nm. wave length are summarized in Table N, and show that the tar-depleted liquid smoke treated cellulose casings of this invention have an ultraviolet absorbance at 210 nm. wave length which is reduced by at least 90% compared to the corresponding tar-containing as-is liquid smoke treated casing having the same total acid content.

TABLE N

Ultraviolet Comparisons at 210 nm Wavelength for Smoke Extracts from Smoke-Treated Casings

| Type of Liquid Smoke | Transmittance % | Absorbance | Percent Reduction in Absorbance* |
|---|---|---|---|
| Charsol C-12 | | | |
| Tar-Depleted | about 100 | zero | about 100 |
| Tar-Containing | 14 | 0.854 | — |
| Royal Smoke AA | | | |
| Tar-Depleted | 86 | 0.066 | 95 |
| Tar-Containing | 6 | 1.222 | — |
| Royal Smoke B | | | |
| Tar-Depleted | about 100 | zero | about 100 |
| Tar-Containing | 6 | 1.222 | — |

*Percent reduction in UV Absorbance of tar-depleted liquid smoke compared to UV Absorbance of tar-containing liquid smoke.

EXAMPLE VIII

All of the previously described tubular food casing treatment experiments involved nonfibrous cellulose casings, but the invention is also useful in treatment of cellulosic fibrous casings. In this experiment, the tar-depleted liquid smoke was prepared from Royal Smoke AA as-is liquid smoke solution by the methylene chloride solvent extraction method of Example I, but without pH adjustment. Fibrous casing stock of about 6.3 inch (16 cm) flat width was then treated with tar-depleted liquid smoke in a process substantially as shown in FIG. 1. The estimated tar-depleted liquid smoke solution loading on the casing was about 20 mgs./sq.in. (3.1 mg/cm$^2$) of casing surface. A sample of this liquid smoke treated casing was stuffed out with a bologna meat emulsion, and then processed in a conventional manner to produce finished bologna, except that no smoke was applied in the smokehouse. The bologna showed good smoke color, odor and flavor when compared with a control bologna processed at the same time in the same smokehouse within a casing which was not treated with any liquid smoke.

In a preferred embodiment of this invention, the tar-depleted liquid smoke composition is prepared from a tar-containing aqueous liquid wood smoke solution having a total acid content of at least about 7 weight %, and most preferably a total acid content of at least about 9 weight %. Total acid content (also referred to as total acidity) is a qualitative measure of the tar content and staining power (previously defined) of as-is liquid wood smokes used by manufacturers. In general, higher total acid content means higher tar content. The same is true of the total solids content of as-is liquid smoke. The procedures used by liquid wood smoke manufacturers to determine total acid content (total acidity) and total solids are as follows:

Determination of Total Acid Content for Tar-Containing Liquid Smoke

1. Weigh accurately about 1 ml. of liquid smoke (filtered if necessary) in a 250 ml. beaker.

ing the same smoke coloring and smoke flavoring function as the tar-depleted aqueous liquid smoke compositions of this invention. It should however be recognized that such low-tar content as-is liquid smoke solutions may be concentrated as for example by evaporation, and the so-concentrated liquid smoke solution then may acquire the characteristics of a tar-containing liquid smoke which can be advantageously treated in the manner of this invention. That is, such concentrated tar-containing liquid smoke acquires higher total acid content, total solids, and staining power.

TABLE O

| Manufacturer's Identification | Commercially Available Liquid Wood Smokes | | | | |
|---|---|---|---|---|---|
| | Total Acid Content[a] % | Total Solids % | % Light Transmittance | Staining Power | Absorptive Power[d] |
| Royal Smoke AA[a] | 11.5–12.0 | 10.2 | 0 | 0.034 | 0.68 |
| Royal Smoke A[a] | 10.5–11.0 | 9.0 | 0 | 0.029 | 0.42 |
| Royal Smoke B[a] | 8.5–9.0 | 8.8 | 0 | 0.025 | 0.36 |
| Royal Smoke 16[a] | 10.0–10.5 | 17.6 | 0 | 0.026 | 0.62 |
| Charsol C-12[b] | 12.0–12.5 | 8.3 | 0 | 0.031 | 0.54 |
| Charsol C-10[b] | 11.5 | not reported | 0 | 0.028 | 0.40 |
| Charsol X-11[b] | 10.0 | 5.8 | 0 | 0.022 | 0.36 |
| Charsol C-6[b] | 6.7 | 4.8 | 73 | 0.016 | 0.22 |
| Charsol C-3[b] | 3.6 | 1.0 | 98 | 0.007 | 0.12 |
| Smokaroma Code - 12[c] | 12.0 | 10.5 | 0 | 0.034 | — |
| Smokaroma Code - 10[c] | 10.2 | 5.1 | 0 | 0.027 | — |
| Smokaroma Code - S[c] | 8.0 | 2.4 | 26 | 0.017 | — |
| Smokaroma Code - 6[c] | 6.2 | 1.9 | 75 | 0.014 | — |

[a]Griffith Laboratories, Inc. 12200 South Central Avenue, Alsip, IL
[b]Red Arrow Products Co., P.O. Box 507, Manitowoc, WI
[c]Meat Industry Suppliers, Inc. 770 Frontage Road, Northfield, IL
[d]Measured at 340 nm
[e]Also referred to as Total Acidity 2. Dilute with about 100 ml. of distilled water and titrate with standard 0.1N NaOH to a pH of 8.15 (pH meter).
3. Calculate the total acid content as percent by weight of acetic acid, using the following conversion: 1 ml. 0.1000N NaOH = 6.0 mg. HAc

Determination of Total Solids

1. Pipet about 0.5 ml. of liquid smoke on a tared 6 cm aluminum moisture dish fitted with a dried Whatman No. 40 filter paper disc, and weigh accurately. The liquid smoke should be clear, and filtration is used to insure this condition.
2. Dry for two hours at 105° C. in a forced draft oven, or for 16 hours at 105° C. in a conventional oven.
3. Cool to room temperature in a desiccator and weigh.
4. Calculate the total solids as percent by weight of the liquid smoke.

As will be discussed hereinafter, this dilution-titration procedure is also used for measuring the total acid content of the tar-depleted liquid smoke composition which has not been at least partially neutralized.

Figure 10:
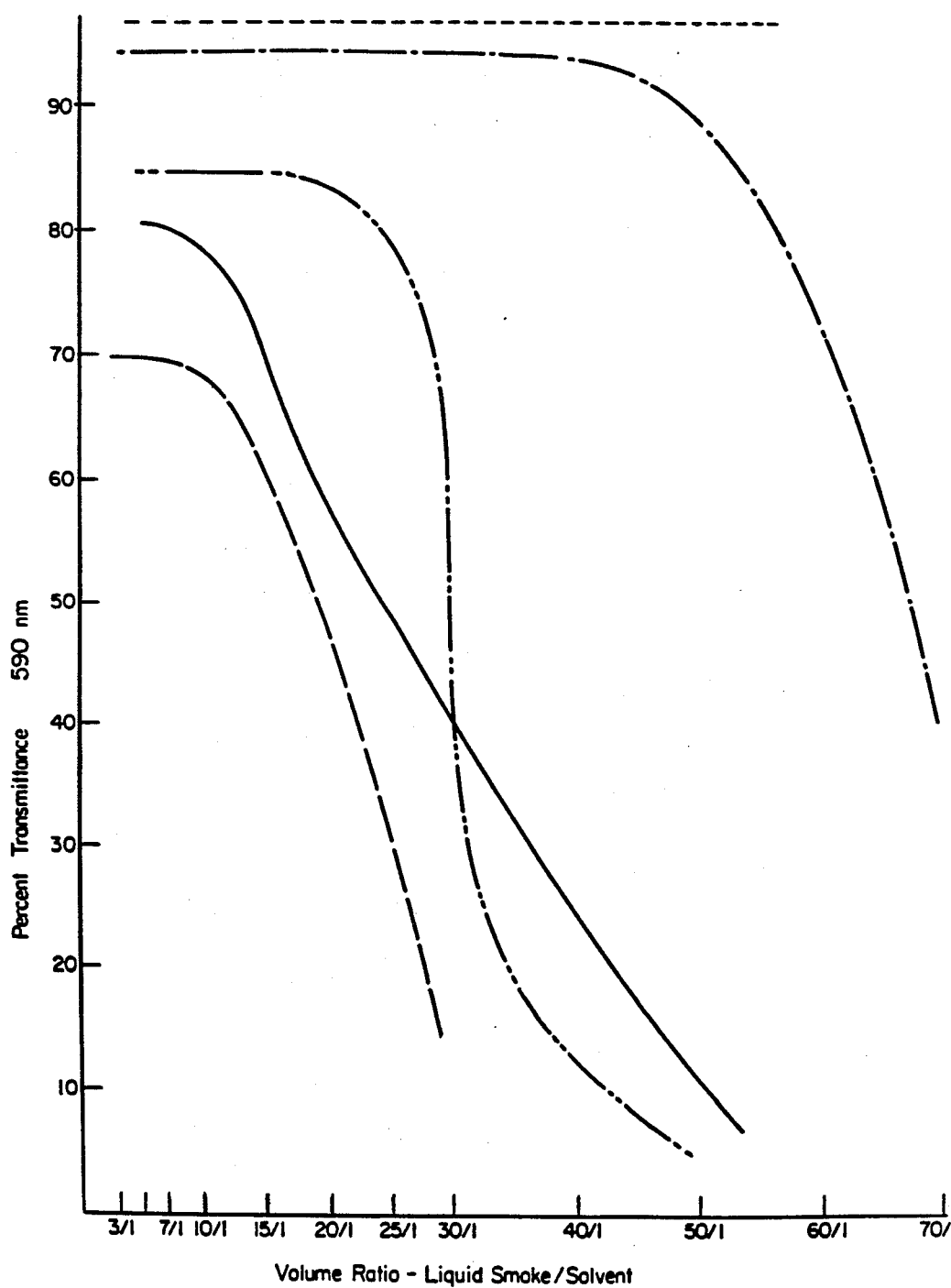
FIG. 10 is a graph showing percent light transmittance at 590 nm as a function of the as-is liquid smoke to solvent volume ratio for several liquid smokes, and over a wide range of volume ratio.

Table O lists the most commonly used and commercially available tar-containing aqueous liquid wood smokes along with their manufacturer-reported Total Acid Content (total acidity), Total Solids Content, Staining Power, and percent light transmittance at 590 nm. are also reported for comparison. It will be noted from Table O that the as-is wood smoke solutions with total acid content values less than about 7 weight % have high transmittance values above 50% and low staining power. Their tar content is so low that their water compatibility is high. Accordingly, there is no need to remove tar from such wood smoke solutions in accordance with this invention. Also, their staining powers are so low that they are not capable of perform- It will be recalled that the aqueous liquid smoke solvent extraction treatment aspect of this invention requires a liquid smoke solution to liquid solvent volume ratio between about 1:1 and 65:1. FIG. 10 illustrates that to obtain the preferred light transmittance of at least 50% at 590 nm, the ratio is a function of the particular liquid solvent to be used. FIG. 10 illustrates that the practitioner also needs to consider the particular type of as-is liquid smoke in the achievement of the desired percent light transmittance.

More particularly, FIG. 10 is a graph showing percent light transmittance at 590 nm. as a function of the as-is liquid smoke to solvent volume ratio for several of the liquid smokes listed in Table O. Royal Smoke AA is shown as a dash line, Charsol C-3 as a dotted line, Charsol C-12 as a solid line, Royal Smoke B as a dash-dot-dash line, and Charsol C-10 as a dash-dot-dot-dash line. The liquid solvent is methylene chloride in all of the experiments summarized in FIG. 10, and the same general relationship exists with respect to other liquid solvents suitable for practice of this invention. This Figure shows that to achieve a particular level of percent light transmittance with a particular solvent, the practitioner may select a liquid smoke having relatively high absorptive power and total acid content, and use a relatively large quantity thereof (i.e., a relatively low smoke to solvent ratio). Alternatively one may use a liquid smoke having relatively low absorptive power and total acid content, and use a relatively small quantity thereof (i.e., a relatively high smoke to solvent ratio). The Figure also shows that for a particular smoke to solvent ratio (the same quantity of liquid smoke), the practitioner will obtain a relatively higher percent light transmittance with a liquid smoke having relatively low absorptive power and total acid content.

FIG. 10 also shows that the upper limit of suitable liquid smoke to solvent ratios for practicing this invention (65:1) is based on the ratio suitable for the liquid smoke of lowest absorptive power (0.3 at 340 nm wave length) and total acid content, to achieve the preferred standard of at least 50% light transmittance at 590 nm. Among the liquid smokes included in the Figure, Royal Smoke B has the lowest acceptable values and its curve indicates a transmittance of about 50% at a liquid smoke to solvent ratio of about 65:1. It should also be noted that the Charsol C-3 curve demonstrates its high compatibility with water without any solvent (98% light transmittance) and at all solvent ratios. Accordingly, the present invention is not useful with as-is Charsol C-3, noting its low absorptive power (0.12) and low total acid content (3.6%).

In general, when the as-is liquid smoke solution has a total acid content between about 7 and 9 wt. %, the selected liquid solvents are effective in a volume ratio between about 30:1 and 65:1 of liquid smoke solution to solvent. Similarly, when the as-is liquid smoke has a total acid content between about 9 and 11.5 wt. %, the solvents are effective in a volume ratio between about 15:1 and about 30:1 of liquid smoke solution to solvent. And when the as-is liquid smoke has a total acid content greater than about 11.5, the volume ratio for effective extraction of the tars is between about 7:1 and about 25:1 of liquid smoke solution to solvent.

Figure 11:
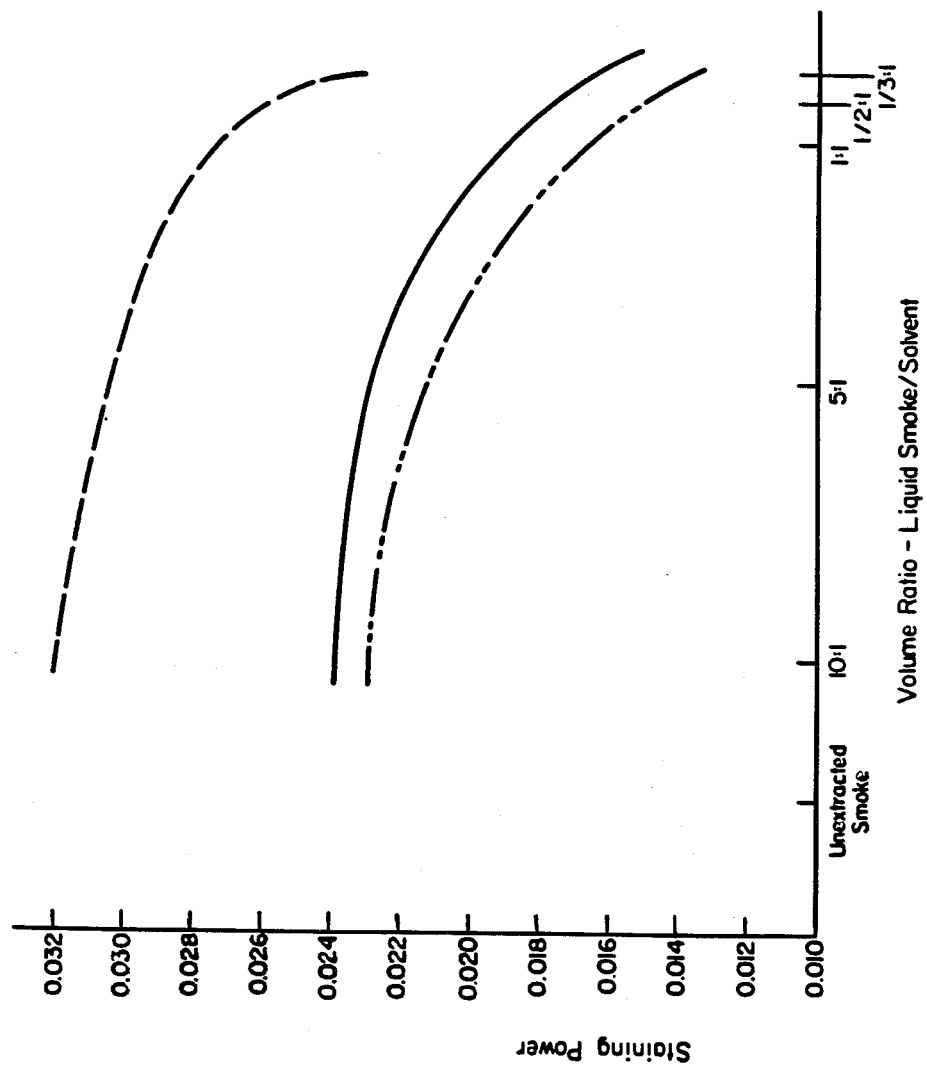
FIG. 11 is a graph showing staining power as a function of volume ratio for relatively low liquid smoke to solvent volume ratios.

Another series of experiments was performed which illustrates the basis for the lower limit of liquid smoke to liquid solvent volume ratio in the practice of this invention—about 1:1. The solvent was methylene chloride, and FIG. 11 shows the effect of decreasing smoke to solvent ratios for Royal Smoke AA (dash line), Charsol C-12 (solid line), and Charsol C-10 (dash-dot-dot-dash line). These data show that with a smoke to solvent volume ratio below about 1:1, the Staining Power of the tar-depleted liquid smoke diminished to a level so low as not to be useful.

Absorptive Power

It will be recalled that both the staining power and staining index measurement procedures involve chemical reaction, and apparently for this reason the values measured at ambient temperature decline under elevated temperature aging conditions. As demonstrated in Example VI, this decline is not an accurate indication of the smoke color in stuffed food product using casings aged after tar-depleted liquid smoke treatment.

Under these circumstances, additional measurement procedures not involving chemical reaction have been used in this invention to determine the coloring capability of liquid smoke and the liquid smoke-treated casing. This measurement procedure for liquid smoke is termed "Absorptive Power" and the measurement procedure for liquid smoke-treated casing is termed "Absorptive Index".

In the procedure for measuring absorptive power, 10 mg. of liquid smoke (either tar-containing liquid smoke or tar-depleted liquid smoke) is placed in a disposable vial and 5 ml. of methanol is added thereto. The two components are mixed by inverting the vial, and the ultraviolet absorption value of the mixture is then measured at 340 nm. This particular wave length is selected because spectroscopy measurements with many liquid smokes indicate greatest linearity in this wave length region. Absorptive power measurements for various as-is liquid smokes are included in Table O. A plot of these absorptive power measurements as a function of total acid content or total solids content reveals an approximately linear relationship.

It should be noted that whereas tar content is a significant contributor to the absorptive power measurement, I have discovered that tar only contributes to the staining of food in a minor way, if at all. Thus, in commercially available as-is smokes, absorptive power includes a measurement of tar content and the coloring constituents such as carbonyls, phenols and acids. This means that absorptive power of as-is smokes and tar-depleted smokes may be used to rank them by smoke coloring ability. However, absorptive power of as-is liquid smoke cannot be numerically compared with the absorptive power of tar-depleted smokes of this invention because of the absorptive effect of tars. Unlike staining power, the absorptive power of liquid smokes does not decline with aging.

EXAMPLE IX

A series of absorptive power measurements was performed on various tar-depleted liquid smokes of this invention, using methylene chloride as the solvent. In each instance the as-is liquid smoke was first neutralized by the addition of sodium hydroxide flake and the neutralization temperature was controllably maintained at 10°–15° C. to remove a first tar portion. The resulting liquid smoke with its partially depleted tar content was then contacted with methylene chloride in order to remove a second tar portion. The liquid extraction procedure was the same as described in Example I, and the liquid smoke to solvent volume ratio was 10:1. These measurements are summarized in Table P.

TABLE P

| Type of Liquid Smoke | Absorptive Power | |
|---|---|---|
| | As-Is | Tar Depleted |
| Royal Smoke AA | 0.51 | 0.26 (0.26)* |
| Royal Smoke A | 0.45 | 0.30 (0.20)* |
| Royal Smoke B | 0.35 | 0.25 (0.15)* |
| Charsol C-10 | 0.40 | 0.33 |
| Charsol C-6 | 0.22 | 0.17 (0.17)* |
| Charsol C-3 | 0.11 | 0.10 |

*Values in parentheses were obtained from different batches of liquid smoke.

Table P should be interpreted in light of the preceding discussion relating to the effect of tar content or liquid smoke absorptive power. Inspection of Table P reveals that the absorptive power of a tar-depleted liquid smoke of this invention is generally lower than the absorptive power of the tar-containing as-is liquid smoke from which it is derived.

Table P also demonstrates that the tar-containing liquid smokes useful in the practice of this invention have absorptive power values of at least about 0.25 and that tar-containing liquid smokes such as Charsol C-3 which are not useful in the as-is form have absorptive powers below 0.25. The absorptive power of the tar-depleted liquid smoke composition of this invention must be at least about 0.15 in order to obtain acceptable smoke color on a foodstuff produced in a smoke treated casing of this invention. In a preferred embodiment the absorptive power of the tar-depleted liquid smoke composition is at least 0.25. It will be recalled that FIG. 10 demonstrates that Charsol C-3 has a very high light transmittance of about 98% because of its low total acid content and low total solids and/or tar content, and solvent extraction treatment does not significantly affect its light transmittance.

Absorptive Index

In the procedure for measuring absorptive index, 2 square inches (12.9 cm$^2$) of liquid smoke-treated casing are cut out after drying, and placed in 10 ml. of methanol. After 1 hour of soaking time, the methanol has extracted all of the smoke components out of the casing, and the ultraviolet absorption value of the resulting smoke component-containing methanol is determined at 340 nm. As with the absorptive power measurement, a 340 nm. wave length was selected because spectroscopy measurements with many liquid smoke extracts from smoke treated casings indicate greatest correlation with smoke loading in this region.

EXAMPLE X

Figure 12:
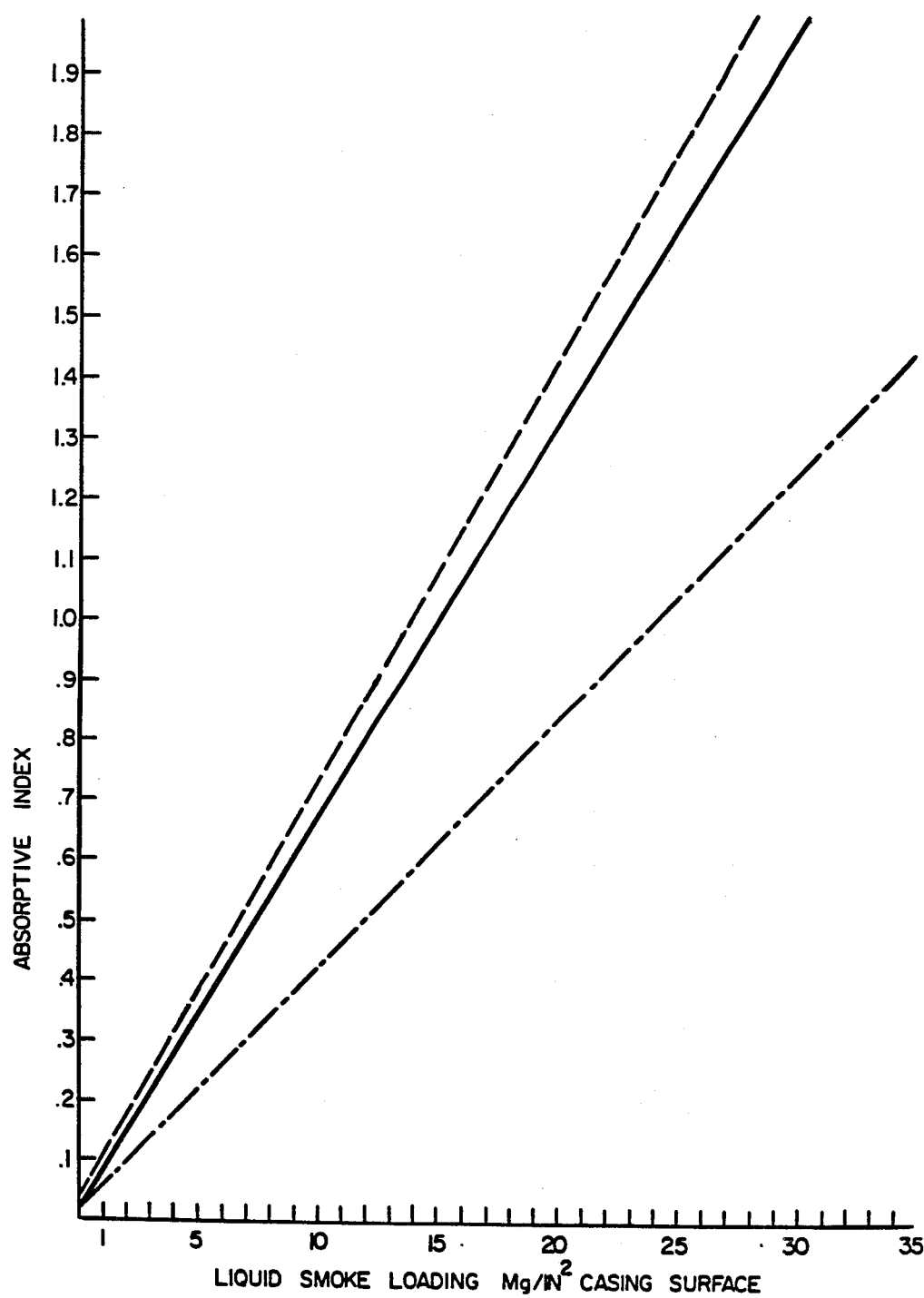
FIG. 12 is a graph showing ultraviolet absorptive index as a function of tar-depleted liquid smoke loading in the food casing.

A series of absorptive index measurements was made on casings using three different types of tar-depleted liquid smoke prepared in accordance with this invention with neutralization to a pH of 5.0. The liquid smokes were applied at different loadings to the exterior surface of non-fibrous frankfurter size gel stock casings in the Example II manner. The results of these experiments are summarized in FIG. 12, with Royal Smoke AA-derived liquid smoke shown as a dash line, Charsol C-12-derived liquid smoke shown as a solid line, and Royal Smoke B-derived liquid smoke shown as a dash-dot-dash line. This figure permits the practitioner to first select the desired extent of smoke color and types of smoke in terms of absorptive index, and then determine the required loading of a particular tar-depleted liquid smoke onto the casing to achieve this smoke color. The correlation between smoke color and absorptive index is illustrated in the following Example XI. In FIG. 12, 1 mg/in$^2$ is equal to 0.155 mg/cm$^2$.

EXAMPLE XI

A series of colorimetric tests was performed using frankfurters prepared in the manner of Example III in non-fibrous casings treated with various liquid smokes including those on which Example X is based. The results of these tests are summarized in Table Q.

TABLE Q

Casing Absorptive Index and Frankfurter Surface Light Intensity

| Sample No. | Type of Liquid Smoke | Loading Mg/cm$^2$ | Casing Absorptive Index | Frankfurter Light Intensity ($-\Delta L$) |
|---|---|---|---|---|
| 1 | Tar-depleted Royal Smoke AA | 1.63 | 0.5 | 2.87 |
| 2 | Tar-depleted Royal Smoke AA | 0.62 | 0.14 | 1.03 |
| 3 | Tar-containing Royal Smoke AA | 1.75 | 0.5 | 3.5 |

In an attempt to quantify the desired light intensity changes needed to insure adequate color development, $\Delta L$ values were determined and are included in Table Q. In this instance, the meat emulsion was 50% beef chuck and 50% regular pork trim, and $\Delta L$ values were considered too low if a 1.4 unit change in light intensity or less, occurred between L values measured on frankfurters produced within a non-smoked control casing compared to a liquid smoke treated casing.

Table Q shows that if the absorptive index is less than about 0.2, the smoke loading is 4.0 mg/in$^2$ (0.62 mg/cm$^2$) or less. This level of smoke loading does not generally give a desired reduction in light intensity to the meat product, i.e., color development is generally considered to be insufficient. Based on extrapolation from Sample Nos. 1 and 2, a medium reduction in light intensity for the frankfurter achieved with a liquid smoke loading of about 8.5 mg/in$^2$ (1.32 mg/cm$^2$) on the casing is quite satisfactory for most end uses, so that the corresponding absorptive index of at least 0.4 for the casing represents a preferred embodiment of the invention.

Table Q also shows that embodiments of this invention have substantially the same staining ability as the original tar-containing liquid smoke. Comparison of Samples Nos. 1 and 3 shows that the tar content of the liquid smoke has very little influence on the staining ability of the liquid smoke. For practical purposes, the frankfurter light intensity of 2.9 for Casing Sample No. 1 is substantially equivalent to the frankfurter light intensity of 3.4 for Casing Sample No. 3.

It should be noted that many factors associated with the food emulsion and processing conditions can affect background color and hence L and $\Delta L$ values. For example, meat derives much of its color from myoglobin. The color associated with myoglobin content of meat is known to be dependent upon chemical reaction of myoglobin and the cure which in turn is affected by processing conditions such as temperature, humidity, time and air velocity. Accordingly, the L values in Table Q are only relevant for these particular tests.

All of the previously described experiments relating to absorptive index were performed on either non-fibrous casings of the same diameter promptly after liquid smoke treatment and drying. Other tests have shown that absorptive index is not significantly affected by variation in casing thickness. Still other tests have shown that absorptive index values for the tar-depleted liquid smoke treated fibrous casings of this invention are about the same as the absorptive index values for non-fibrous cellulose casing with the same amount of smoke coating. Thus, the broad requirement for absorptive index of at least 0.2 and the preferred value of at least 0.4 is also applicable to fibrous casing. By way of illustration, an absorptive index of 0.43 was obtained with a fibrous cellulosic casing of 115 mm diameter treated with tar-depleted liquid smoke derived from Royal Smoke AA at a loading of 10.1 mg./in$^2$ (1.57 mg/cm$^2$) of casing external surface. The absorptive index for the nonfibrous cellulose casing, treated with the same amount of liquid smoke in the same manner, is found from other tests to be about 0.4.

EXAMPLE XII

A series of tests was performed on tar-depleted frankfurter size cellulose casings to demonstrate the minor effect of elevated temperature aging on absorptive index.

In these tests tar-containing as-is liquid smoke was first neutralized to a pH of 5.0 by the addition of sodium hydroxide flake with the neutralization temperature being controllably maintained at 10°–15° C. The liquid extraction procedure was the same as described in Example I, and the liquid smoke to solvent ratio was 10:1. Absorptive index measurements were obtained on the tar-depleted liquid smoke treated casing promptly after treatment and drying, and after storage periods of five and twelve weeks at ambient temperatures. Other samples of the same casing were heated to 100° F. (38° C.)

and absorptive index measurements were obtained at the same time intervals. These measurements are summarized in Table R.

TABLE R

| Absorptive Index of Aged Casing | |
|---|---|
| Time and Temperature | Absorptive Index |
| Initial at 21° C. | 0.52 |
| Five Weeks at 21° C. | 0.49 |
| Twelve Weeks at 21° C. | 0.49 |
| Five Weeks at 38° C. | 0.54 |
| Twelve Weeks at 38° C. | 0.59 |

Table R demonstrates that aging has no significant effect on absorptive index. The absorptive index requirements of this invention are to be understood as based on measurements at ambient temperature.

In another preferred embodiment of this invention, the tar-depleted aqueous liquid smoke composition has a total acid content of at least about 7 weight percent and most preferably a total acid content of at least about 9 weight percent. Total acid content is a qualitative measure of the staining power (previously defined) of not only tar-containing liquid smokes but also tar-depleted liquid smokes prepared therefrom by the solvent extraction method of this invention. This invention does not require at least partial neutralization of either the highly acidic tar-containing liquid smoke or the tar-depleted liquid smoke composition, although this may be desirable. If the tar-depleted liquid smoke composition is not neutralized for purposes of this invention, its total acid content is measured by the same dilution-titration procedure previously outlined for measuring a total acid content of tar-containing (as-is) liquid smoke. If the tar-depleted liquid smoke composition is at least partially neutralized, the total acid content is measured by a steam distillation recovery-titration procedure. This method is theoretically capable of quantifying the acids such as the acetate and formate, which are formed in the at least partially neutralized tar-depleted liquid smoke composition. From a reaction standpoint, the acid percent in the aqueous liquid smoke (in free or salt form) remains constant during at least partial neutralization. However, the recovery of these acids is only about 70% due to an inability to achieve complete azeotropic recovery within reasonable distillation volumes. At present, a procedure providing quantitative recovery of all acidic compounds from the tar-depleted liquid smoke regardless of state is not readily available. Under these circumstances, the results obtained by the steam distillation recovery-titration procedure are multiplied by a factor of 1.4 for conversion to the same total acid content basis used with tar-containing liquid smoke. Measurement of total acid, phenol and carbonyl contents in smoke treated casing is determined by the following procedures.

Determination of Total Acid Content for at least Partially Neutralized Tar-Depleted Liquid Smoke and Treated Casings Produced Therefrom This determination is made from the milliequivalents of sodium hydroxide (NaOH) required to neutralize the milliequivalents of acetic acid (HAc) which are distilled upon acidification of the at least partially neutralized tar-depleted liquid smoke composition or treated casings produced from that composition. "Milliequivalent" refers to the weight in grams of a substance contained in 1 ml. of a 1.0 Normal solution. The procedure is as follows:

1. Weigh accurately 5 gm. of tar-depleted smoke into a tared 800 ml. Kjeldahl flask. For casings, measure accurately 100 square inches of casing surface.
2. Add boiling chips and 100 ml. of 2% (v/v) $H_2SO_4$ to the flask, the reaction being $2NaAc + H_2SO_4 \rightarrow 2HAc + Na_2SO_4$.
3. Place a 500 ml. Erlenmeyer flask containing 100 ml. of deionized water into an ice bath, and use this water to collect the distillate.
4. Connect the sample-containing Kjeldahl flask to the steam distillation apparatus.
5. Distill the sample until the distillate volume in the collecting Erlenmeyer flask reaches 500 ml.
6. Titrate 100 ml. of distillate with 0.1N NaOH to an end point pH of 7.0, the reaction being $HAc + NaOH \rightarrow NaAc + H_2O$.
7. Calculate the measured acid content as weight of acetic acid on the basis that 1 ml. of 0.1N NaOH is equal to 6.0 mg. of HAc, so measured acid content in mg. = ml. of titrant $\times$ 6.0.
8. Total acid content = 1.4 $\times$ measured acid content in mg.
9. For liquid smoke, express the value of total acid content in mg. as the wt. % of the original liquid smoke sample. For casing, express the value of total acid content as mg. of acid per 100 square centimeter of casing surface.

The total acid contents of several tar-depleted liquid smoke compositions of this invention have been measured by this steam distillation recovery-titration procedure, and are listed in Table S. For comparison, the same procedure has been used to measure the total acid content of the as-is tar-containing liquid smokes from which these compositions were derived, and the results are also listed in Table S. It will be noted that the values are quite similar for the same type of liquid smoke, whether it be tar-containing or tar-depleted. For example, as-is Royal Smoke AA liquid smoke has a total acid content of 11.1% and in one experiment tar-depleted Royal Smoke AA liquid smoke has a total acid content of 11.7%. For further comparison, as-is Royal Smoke AA liquid smoke, as measured by the dilution-titration procedure used by the manufacture and outlined herein for tar-containing liquid smoke, has also been included in Table S. This value of 11.4% is also very similar to the values for Royal Smoke AA based on the steam distillation recovery-titration procedure.

TABLE S

| | Total Acid Content of As-Is and Tar-Depleted Liquid Smoke | | |
|---|---|---|---|
| Smoke Type | Tar Content | Analytical Method | Total Acid Content in % |
| Royal Smoke AA | as-is | Dilution/Titration | 11.4 |
| " | " | Steam Distillation/Titration | 11.1 |
| Royal Smoke A | " | Steam Distillation/Titration | 10.2 |
| Royal Smoke B | " | Steam Distillation/Titration | 9.1 |
| Royal Smoke 16 | " | Steam Distillation/Titration | 9.8 |
| Charsol C-12 | " | Steam Distillation/ | 11.8 |

TABLE S-continued

Total Acid Content of As-Is and Tar-Depleted Liquid Smoke

| Smoke Type | Tar Content | Analytical Method | Total Acid Content in % |
|---|---|---|---|
| Royal Smoke AA | Tar-Depleted | Titration Steam Distillation/ Titration | 11.7 |
| Charsol C-12 | Tar-Depleted | Steam Distillation/ Titration | 10.5 |

Determination of Phenol and Carbonyl Content in Liquid Smoke-Treated Casings The samples are prepared by measuring and steam distilling 200 to 300 square inches (0.129–0.194 $m^2$) of casing external surface, as described in the procedure for determination of total acid content.

The reagents for the phenol determination are prepared with distilled water, as follows:
1. Color solution—Dissolve 100 mg. of N-2,6-trichloro-p-benzoquinoneimine in 25 ml. of ethanol, and refrigerate. For the test, dilute 2 ml. to 30 ml. with water.
2. Buffer, pH 8.3—Dissolve 6.1845 gm. of boric acid in 250 ml. of water. Dissolve 7.45 gm. of potassium chloride in 250 ml. of water. Dissolve 0.64 gm. of NaOH in 80 ml. of water. Mix the three solutions together.
3. 1.0% NaOH—Dissolve 1.0 gm. of NaOH in water. Dilute to 100 ml.
4. Standard solution—Dissolve 0.200 gm. of dimethoxy-phenol (DMP) in 2000 ml. water. Then dilute portions of this solution to provide standard solutions containing 1 ppm, 2 ppm, 4 ppm, 6 ppm, and 8 ppm of DMP.

The procedure for phenol determination is a modified Gibbs method, as described in Wild F, *Estimation of Organic Compounds*, 143, 90–94, University Press, Cambridge, 1953. In this procedure, the sequence is as follows:

1st—In a 25 ml. flask, mix the four constituents in the order listed:
   5 ml. buffer pH 8.3
   5 ml casing distillate standard, or water (blank)
   1 ml. 1% NaOH
   1 ml. dilute color reagent
2nd—Shake, stopper and place in dark for 25 minutes.
3rd—Read absorbance at 580 nm.
4th—Prepare a standard curve using absorbance as the abscissa and standard concentrations as the ordinate. Extrapolate concentration of DMP in casing distillates from this curve.
5th—Calculate mg DMP/100 $cm^2$ casing using the following equation:

$$\frac{\text{ppm } DMP \text{ (from std curve)} \times 500 \text{ (dilution)} \times 0.001 \text{ mg}/\mu g}{\text{area of original sample}} \times 100 = \text{mg } DMP/100 \text{ cm}^2$$

The reagents for the carbonyl determination are as follows:
1. Saturated solution of recrystallized 2,4-dinitrophenylhydrazine (DNP) in carbonyl-free methanol.
2. Concentrated HCl.
3. 10% Alcholic KOH—Dissolve 10 gm. KOH in 20 ml. distilled water and dilute to 100 ml. with carbonyl-free methanol.
4. Standard solutions—Dilute 1 ml. 2-butanone (methyl-ethyl-ketone) (MEK) to 2000 ml. with distilled water. Then dilute portions of this solution to provide standard solutions containing 0.8 ppm, 1.6 ppm, 2.4 ppm, 4.0 ppm, and 8.0 ppm of MEK.

The procedure for carbonyl determination is a modified Lappan-Clark method as described in the article "Colorimetric Method for Determination of Traces of Carbonyl Compounds", Anal. Chem., 23, 541–542 (1951). In this procedure, the sequence is as follows:

1st—In a 25 ml. flask, mix the three constituents in the order listed:
   5 ml. of 2,4 DNP solution
   5 ml. casing distillate, standard, or water (blank)
      note: casing distillate may require further dilution.
   1 drop concentrated HCl.
2nd—Digest the mixture for 30 minutes in 55° C. water bath.
3rd—After rapidly cooling the digested mixture to room temperature, add 5 ml. 10% alcoholic KOH, shake and let stand for 30 minutes.
4th—Read absorbance at 480 nm.
5th—Prepare a standard curve using absorbance as the abscissa and standard concentrations as the ordinate. Extrapolate concentration of MEK in casing distillates from this curve.
6th—Calculate mg MEK/100 $cm^2$ casing using the following equation:

$$\frac{\text{ppm MEK (from std curve)} \times \text{(dilution factor)} \times 0.001 \text{ mg}/\mu g}{\text{area of original sample}} \times 100 = \text{mg MEK}/100 \text{ cm}^2$$

EXAMPLE XIII

It has previously been indicated that the tar-depleted liquid smoke composition of this invention preferably has a light transmittance of at least 50% as an indicator that a substantial portion of the tar content has been removed so as to avoid tarring during casing treatment therewith. This preference was demonstrated by a series of tests in which Royal Smoke AA was contacted under extraction conditions in the previously described manner with methylene chloride solvent in various liquid smoke solution to liquid solvent volume ratios. A tar-depleted liquid smoke fraction was separated and its light transmittance was measured, also in the previously described manner. The weight percent nonvolatiles (including tars) in this tar-depleted liquid smoke fraction was also determined. The data from these tests is summarized in Table T and the FIG. 13 graph.

TABLE T

Light Transmittance vs. Percent Nonvolatiles

| Liquid Smoke/Solvent | % Transmittance | % Nonvolatiles |
|---|---|---|
| As-is liquid smoke (no solvent) | 0 | 8.9 |
| 50/1 | 3.5 | 8.5 |
| 33/1 | 8.1 | 8.4 |
| 25/1 | 27.7 | 8.0 |
| 20/1 | 48.7 | 6.5 |
| 15/1 | 63.2 | 5.9 |
| 14/1 | 70.2 | 6.0 |
| 10/1 | 72.0 | 6.0 |
| 10/1 | 76.7 | 5.9 |

TABLE T-continued

| Light Transmittance vs. Percent Nonvolatiles | | |
|---|---|---|
| Liquid Smoke/Solvent | % Transmittance | % Nonvolatiles |
| 7/1 | 77.1 | 5.6 |

Figure 13:
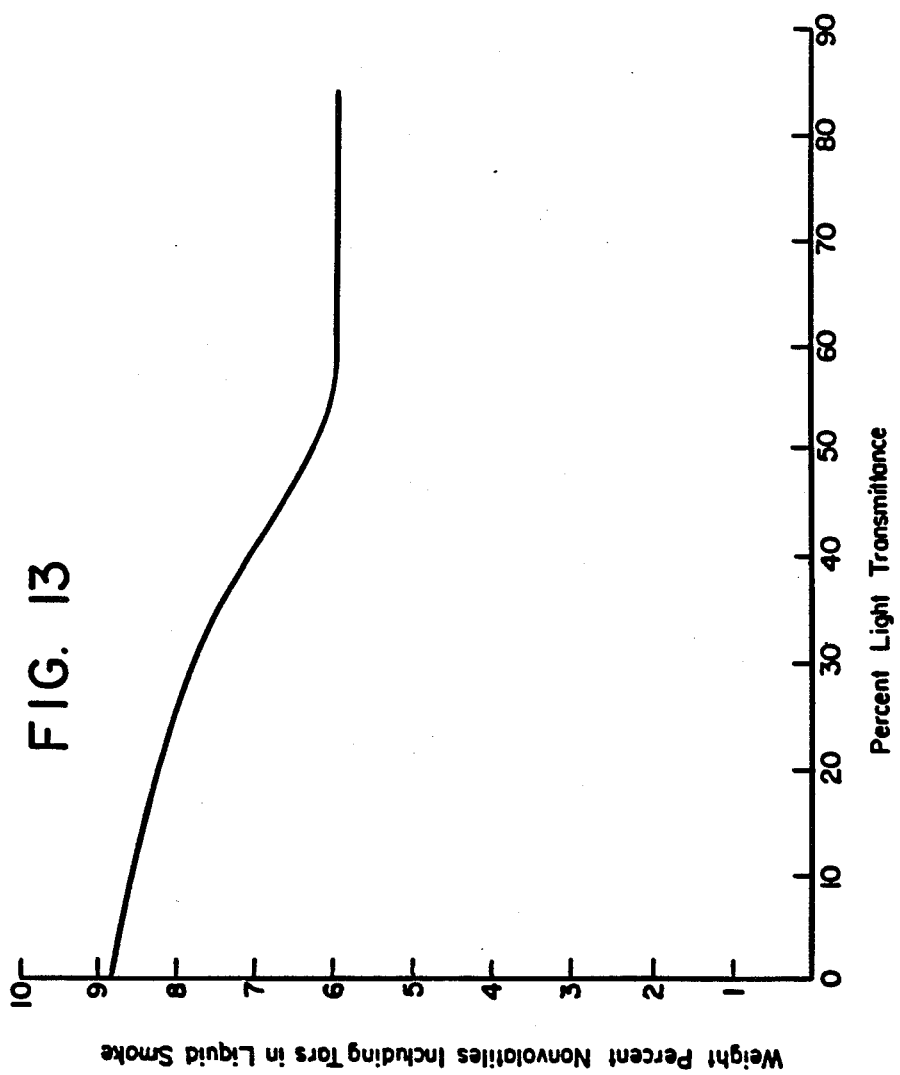
FIG. 13 is a graph showing percent nonvolatiles (including tars) in liquid smoke as a function of percent light transmittance.

Inspection of this data and FIG. 13 indicates that light transmittance is heavily influenced by the nonvolatiles (including tars) content in the 0 to about 50% light transmittance range. That is, one must progressively reduce the liquid smoke's tar content by, for example, the practice of this invention, to progressively increase the liquid smoke's light transmission from 0 to about 50%. When sufficient tar has been removed to achieve a light transmittance of at least about 50%, a plateau is reached and further improvement in light transmittance does not primarily depend on additional tar removal.

Although preferred embodiments of this invention have been described in detail, it is contemplated that modifications thereof may be made and some features may be employed without others, all within the spirit and scope of the invention. For example it should be understood that as-is tar-containing liquid smokes which are advantageously treatable in the manner of this invention may be further concentrated by well-known techniques before or after treatment, and before use in accordance with this invention. This may be desirable if the practitioner wishes to apply a highly concentrated form of tar-depleted liquid smoke to a casing wall.

Another contemplated variation from the as-described embodiments of the invention is the method for separating the tar-containing liquid smoke and liquid solvent mixture into a tar-enriched liquid fraction and a tar-depleted liquid smoke fraction. In the Examples this was done by a single stage extraction with gravity decanting, but other methods may be used as will be understood by those skilled in the art. These methods include single stage contacting and multi-stage contacting of the two liquids, and such contacting may occur under ambient conditions or under elevated temperatures and elevated pressures. Such extraction methods may be undertaken in various types of equipment such as liquid-liquid cyclones or centrifugal contactors. Multistage extractions can be undertaken by using a plurality of such devices or by using a vertical countercurrent column. Countercurrent columns include spray towers, packed columns, decked columns containing sieve trays or modified bubble trays, and columns with internal agitation such as rotary disc columns.

The tar-depleted liquid smoke treatment of a tubular food casing surface in the manner of this invention is preferably practiced under controlled environmental conditions wherein the presence of minute metal particles is minimized. This is an important requirement since metal wear particles (primarily iron, copper, brass) in contact with the casing react with the liquid smoke coating, resulting in auto-oxidation, discoloration and even cellulose degradation of the treated casing. The discoloration and cellulose degradation occur only in the immediate area of the metal contamination and seldom exceed 2-10 mm diameter in size. The cellulose degradation may sometimes be severe enough to cause casing breakage during stuffing or processing. The materials of construction of the treatment apparatus is an important factor in minimizing minute metal particles. These materials should be (1) of high wear resistance, and (2) nonreactive to the liquid smoke. It has been determined that certain metals and alloys are compatible with these stringent requirements. They are: certain aluminum alloys, chrome plating, tin alloys, and certain stainless steels. Care must also be used in other steps of casing manufacture and handling to minimize the presence of minute metal particles.

EXAMPLE XIV

Four samples of tar-depleted liquid smoke were prepared with varying light transmittance values using the solvent extraction method. The as-is liquid smoke solution used was "Charsol C-12", and had an absorptive power of about 0.5 at a wave length of 340 nm, and a pH of about 2. Each of the three samples was prepared essentially as in Example I, except that each sample was solvent extracted to give a differing light transmittance value for each of the resulting tar-depleted liquid smoke solutions. To an amount of methylene chloride were added about 3785 ml of the as-is liquid smoke, and the liquids were mixed by stirring or shaking. The methylene chloride containing the tars was separated from the liquid smoke by decanting. The light transmittance was varied by varying the amount of methylene chloride used in the extraction. The light transmittance was measured by diluting 1 ml of tar-depleted liquid smoke with 10 ml of water and measuring light transmittance relative to water on a Hitachi Model 100-60 spectrophotometer at a wave length of 590 nm. In Table V are shown the amount, for each sample, of methylene chloride ($MeCl_2$) to solvent extract the tars from the as-is smoke, and the pH and light transmittance of the tar-depleted liquid smoke product.

TABLE U

| Sample No. | $MeCl_2$ (ml) | pH | Light Trans. |
|---|---|---|---|
| 1 | 155 | 2.2 | 40.% |
| 2 | 190 | 2.2 | 50.% |
| 3 | 315 | 2.2 | 60.% |
| 4 | 375 | 2.2 | 84.% |

The above prepared samples were applied to a gel stock nonfibrous frankfurter casing (size No. 25) using the apparatus and method of Example IV to give a loading of 15.5 grams liquid smoke per square meter of casing surface. The casings were dried as in Example IV for 3 minutes at a drying temperature between about 80° C. and about 120° C.

During the application of the tar-depleted liquid smoke, the casing was observed for tar spots thereon and the drying guides and the squeeze rolls of the drying unit were observed for tar buildup. The results of the observations are summarized in Table V.

TABLE V

| Sample | Light Trans. | Observation |
|---|---|---|
| 1 | 40.% | Tar deposits formed immediately on casing. Slight sticking on squeeze rolls. Tar deposits formed on drying guides. |
| 2 | 50.% | Tar deposits formed on casing after five minutes. No sticking on squeeze rolls. Tar deposits formed on drying guides. |
| 3 | 60.% | Tar deposits formed on casing after twenty minutes. No sticking on squeeze rolls. Tar deposits formed on drying guides. |
| 4 | 84.% | No tar deposits on the casing or dryer guides. No sticking on |

TABLE V-continued

| Sample | Light Trans. | Observation |
|---|---|---|
| | | squeeze rolls with extended operating (12 hours). |

As can be seen from the above results, the problems due to the presence of tar in the tar-depleted liquid smoke solution, as reflected by the lower light transmittance values, become less as the tar content is lowered or the light transmittance value is increased. With tar-depleted liquid smoke having a light transmittance of about 40%, the difficulties caused by the tars, in particular the sticking on the squeeze rolls, render the coating process inoperable and this composition is, therefore, unacceptable. At a light transmittance of about 50%, there are still some difficulties, such as the formation of tar spots on the casing after a period of running time. However, spot free casings are made during the initial running time which are acceptable from a commercial standpoint. As the light transmittance rises to about 60%, the period of running time before the tar spots appear on the casing is longer and the coating process becomes, therefore, more practical. At a light transmittance of about 84% an extended running time can be accomplished without any problems of spotting and tar-buildup. Tar-depleted liquid smokes having a high light transmittance, can be used in a coating process without encountering any problems involving tar-buildup or other related difficulties that lead to the shutting down of the coating process.

What is claimed is:

1. A method of preparing an aqueous liquid smoke composition comprising: providing a tar-containing aqueous liquid smoke solution, having an absorptive power of at least about 0.25 at 340 nm. wave length, and an organic liquid solvent which is either nonreactive with said liquid smoke solution or reactive with said liquid smoke solution to form a derivative liquid solvent, said liquid solvent being immiscible in the liquid smoke solution and having a hydrogen bonding solubility parameter in the liquid smoke environment of at least about 2.7; extracting said liquid smoke solution with said liquid solvent, in a volume ratio between about 1:1 and 65:1 of liquid smoke solution to liquid solvent, under extraction conditions to form a tar-enriched liquid solvent fraction and an aqueous tar-depleted liquid smoke fraction; and separating the fractions to provide said aqueous tar-depleted liquid smoke fraction as said aqueous liquid smoke composition.

2. A method according to claim 1 in which the liquid solvent has a sum total of hydrogen bonding solubility parameter plus weight percent solvent solubility in water of between about 2.7 and 9, and said liquid smoke solution and said liquid solvent are provided in a volume ratio of at least about 6:1 of liquid smoke solution to liquid solvent.

3. A method according to claim 1 in which said tar-containing aqueous liquid smoke solution has a total acid content of at least about 7 weight %.

4. A method according to claim 1 in which said tar-containing aqueous liquid smoke solution has a total acid content of between about 7 and about 9 weight % and said solvent is provided in a volume ratio between about 30:1 and about 65:1 of liquid smoke solution to liquid solvent.

5. A method according to claim 4 in which said solvent is a di- or trihalogen substituted methane liquid.

6. A method according to claim 1 in which said tar-containing aqueous liquid smoke solution has a total acid content of between about 9 and about 11.5 weight % and said solvent is provided in a volume ratio between about 15:1 and about 30:1 of liquid smoke solution to liquid solvent.

7. A method according to claim 6 in which said solvent is a di- or trihalogen substituted methane liquid.

8. A method according to claim 1 in which said tar-containing aqueous liquid smoke solution has a total acid content greater than about 11.5 weight percent and said solvent is provided in a volume ratio between about 7:1 and about 25:1 of liquid smoke solution to liquid solvent.

9. A method according to claim 8 in which said solvent is a di- or trihalogen substituted metbane liquid.

10. A method according to claim 1 in which said tar-containing aqueous liquid smoke solution has a total acid content greater than about 11.5 weight percent, methylene dichloride is said liquid solvent, and said methylene dichloride is provided in a volume ratio between about 7:1 and about 25:1 of liquid smoke solution to methylene dichloride.

11. A method according to claim 1 in which said tar-containing aqueous liquid smoke solution has a total acid content greater than about 11.5 weight percent, bromochloromethane is said liquid solvent, and said bromochloromethane is provided in a volume ratio between about 15:1 and about 25:1 of liquid smoke solution to bromochloromethane.

12. A method according to claim 1 in which said tar-containing aqueous liquid smoke solution has a total acid content greater than about 11.5 weight percent, chloroform is said liquid solvent, and said chloroform is provided in a volume ratio between about 1:1 and about 16:1 of liquid smoke solution to chloroform.

13. A method according to claim 1 in which said tar-containing aqueous liquid smoke solution has a total acid content greater than about 11.5 weight percent, bromoform is said liquid solvent, and said bromoform is provided in a volume ratio between about 1:1 and about 3:1 of liquid smoke solution to bromoform.

14. A method according to claim 1 in which a high pH constituent is added to said aqueous tar-depleted liquid smoke fraction for at least partial neutralization thereof to form said aqueous liquid smoke composition.

15. A method according to claim 1 in which said tar-containing aqueous liquid smoke solution is at least partially neutralized to a pH of at least about 4, and is contacted with said liquid solvent.

16. A method according to claim 15 in which the temperature of said liquid smoke solution during the at least partial neutralization is controlled so as not to rise above about 40° C.

17. A method according to claim 1 wherein the organic liquid solvent is acetophenone.

18. A method according to claim 1 wherein the organic liquid solvent is n-octyl alcohol.

19. A tar-depleted, water compatible, aqueous liquid smoke solution with smoke coloring and smoke flavoring capability, prepared by the steps of: providing a tar-containing aqueous liquid smoke solution, having an absorptive power of at least about 0.15 at 340 nm. wave length, and an organic liquid solvent which is either nonreactive with said liquid smoke solution or reactive with said liquid smoke solution, to form a derivative liquid solvent, said liquid solvent being immiscible in the liquid smoke solution and having a hydrogen bonding solubility parameter in the liquid smoke environment of at least about 2.7; extracting said liquid smoke solution with said liquid solvent, in a volume ratio between about 1:1 and about 65:1 of liquid smoke solution to liquid solvent, under extraction conditions to form a tar-enriched liquid solvent fraction and a tar-depleted aqueous liquid smoke fraction; and separating the fractions to provide said tar-depleted aqueous liquid smoke fraction as said tar-depleted aqueous liquid smoke solution.

20. A tar-depleted aqueous liquid smoke solution according to claim 19 in which the liquid solvent has a sum total of hydrogen bonding solubility parameter plus weight percent solvent solubility in water of between about 2.7 and about 9, and said liquid smoke solution and said liquid solvent are provided in a volume ratio of at least about 6:1 of liquid smoke solution to liquid solvent.

21. A tar-depleted aqueous liquid smoke solution according to claim 19 in which said contacting and separating are performed so as to provide an aqueous liquid smoke solution with at least 50% light transmittance.

22. A tar-depleted aqueous liquid smoke solution according to claim 19 in which said tar-containing liquid smoke solution has a total acid content of between about 7 and about 9 weight %, and said liquid solvent is provided in a volume ratio between about 30:1 and about 65:1 of liquid smoke solution to liquid solvent.

23. A tar-depleted aqueous liquid smoke solution according to claim 22 in which said liquid solvent is a di- or trihalogen substituted methane.

24. A tar-depleted aqueous liquid smoke solution according to claim 19 in which said tar-containing liquid smoke solution has a total acid content of between about 9 and about 11.5 weight % and said liquid solvent is provided in a volume ratio between about 15:1 and about 30:1 of liquid smoke solution to liquid solvent.

25. A tar-depleted aqueous liquid smoke solution according to claim 24 in which said liquid solvent is a di- or trihalogen substituted methane.

26. A tar-depleted aqueous liquid smoke solution according to claim 19 in which said tar-containing liquid smoke solution has a total acid content greater than about 11.5 weight % and said liquid solvent is provided in a volume ratio between about 7:1 and about 25:1 of liquid smoke solution to liquid solvent.

27. A tar-depleted aqueous liquid smoke solution according to claim 26 in which said liquid solvent is a di- or trihalogen substituted methane.

28. A tar-depleted aqueous liquid smoke solution according to claim 19 in which said tar-containing liquid smoke solution has a total acid content greater than about 11.5 weight %, methylene dichloride is said liquid solvent, and said methylene dichloride is provided in a volume ratio between about 7:1 and about 25:1 of liquid smoke solution to methylene dichloride.

29. A tar-depleted aqueous liquid smoke solution according to claim 19 having an absorptive power of at least 0.25 at 340 nm. wave length.

* * * * *

UNITED STATES PATENT AND TRADEMARK OFFICE
CERTIFICATE OF CORRECTION

PATENT NO. : 4,609,559
DATED : September 2, 1986
INVENTOR(S) : Myron D. Nicholson It is certified that error appears in the above—identified patent and that said Letters Patent is hereby corrected as shown below:

Column 10, line 48, after "(a)" delete "B"

Column 11, line 12, after "vaporization" delete "of" and insert -- at --

Column 23, line 60, delete "to" and insert -- of --

Column 46, line 18, delete "metbane" and insert -- methane --

Signed and Sealed this

Tenth Day of May, 1988

*Attest:*

DONALD J. QUIGG

*Attesting Officer*   *Commissioner of Patents and Trademarks*